US012379096B2

(12) United States Patent
Chen et al.

(10) Patent No.: US 12,379,096 B2
(45) Date of Patent: Aug. 5, 2025

(54) HIGH BAY LIGHT FIXTURE WITH DIE CAST HOUSING

(71) Applicant: NICOR, INC., Albuquerque, NM (US)

(72) Inventors: Jialiang Chen, Jiangmen (CN); Jibo Cao, Zhongshan (CN); Jiabin Yu, Zhongshan (CN)

(73) Assignee: NICOR, INC., Albuquerque, NM (US)

( * ) Notice: Subject to any disclaimer, the term of this patent is extended or adjusted under 35 U.S.C. 154(b) by 51 days.

(21) Appl. No.: 18/141,246

(22) Filed: Apr. 28, 2023

(65) Prior Publication Data

US 2023/0349536 A1 Nov. 2, 2023

Related U.S. Application Data

(60) Provisional application No. 63/337,008, filed on Apr. 29, 2022.

(51) Int. Cl.

| | |
|---|---|
| ***F21V 15/015*** | (2006.01) |
| ***F21V 17/12*** | (2006.01) |
| ***F21V 23/00*** | (2015.01) |
| ***F21V 23/04*** | (2006.01) |
| ***F21V 29/76*** | (2015.01) |
| ***F21V 29/83*** | (2015.01) |
| *F21Y 115/10* | (2016.01) |

(52) U.S. Cl.

CPC ............ *F21V 15/015* (2013.01); *F21V 17/12* (2013.01); *F21V 23/006* (2013.01); *F21V 23/0471* (2013.01); *F21V 29/763* (2015.01); *F21V 29/83* (2015.01); *F21Y 2115/10* (2016.08)

(58) Field of Classification Search

CPC ...... F21V 15/015; F21V 29/763; F21V 29/83; F21V 17/12; F21V 23/006; F21V 23/0471

See application file for complete search history.

(56) References Cited

U.S. PATENT DOCUMENTS

| | | | | |
|---|---|---|---|---|
| 9,016,892 B1 * | 4/2015 | Scribante | .............. | F21V 17/002 362/326 |
| 10,386,058 B1 * | 8/2019 | Cattoni | ................. | F21V 29/763 |
| 2015/0092410 A1 * | 4/2015 | Boyer | ....................... | F21S 8/06 362/249.02 |
| 2015/0354794 A1 * | 12/2015 | Guercio | ................ | F21V 29/745 362/249.1 |
| 2016/0208998 A1 * | 7/2016 | Greinke | ................ | F21V 15/013 |
| 2018/0142850 A1 * | 5/2018 | Chami | .................. | F21V 29/507 |

* cited by examiner

*Primary Examiner* — Christopher E Dunay

(74) *Attorney, Agent, or Firm* — LOZA & LOZA, LLP; Richard H. Krukar

(57) ABSTRACT

A high bay light fixture with a monolithic die cast housing. An LED driver and a sensor socket can be installed in a component tray in the center section. The left section and the right section of the housing have LED channels in which LED assemblies are mounted. Lenses can be slid into the LED channels via the open ends of the LED channels. Channel caps are attached to the open ends. Closed ends can also be formed into the housing. The channel caps and the closed ends prevent the lenses from sliding out of the LED channel. Lens tabs prevent the lens from falling out of the LED channels. The housings have bonding bracket mount points and can be attached end to end by bonding brackets attached to the bonding bracket mount points, thereby forming dual and triple fixtures.

20 Claims, 19 Drawing Sheets

HIGH BAY LIGHT FIXTURE WITH DIE CAST HOUSING

CROSS REFERENCE TO RELATED APPLICATIONS

This patent application claims the priority and benefit of U.S. provisional patent application 63/337,008 filed Apr. 29, 2022 and titled "HIGH BAY LIGHT FIXTURE WITH DIE CAST HOUSING". U.S. provisional patent applications 63/337,008 is herein incorporated by reference in its entirety.

FIELD OF THE INVENTION

Embodiments are related to light emitting diode (LED) lighting, light fixtures, high bay light fixtures, die cast housings, large die cast housings, thermal control, and high efficiency LED lighting.

BACKGROUND

High bay light fixtures are often used in industrial settings and therefore must be highly reliable and efficient while also meeting safety requirements.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure as a prelude to the more detailed description that is presented later.

One example of the subject matter described in this disclosure can be implemented as a light fixture. The light fixture can include a housing that includes a left section, a right section, and a center section. The light fixture can include a cover that is attached to the center section and that covers a component tray of the center section, a right LED assembly in a right LED channel of the right section, a right lens that slides into the right section and that is held in the right section by a closed end of the right section and a right channel cap attached at an open end of the right section, a left LED assembly in a left LED channel of the left section, a left lens that slides into the left section and that is held in the left section by a closed end of the left section and a left channel cap attached at an open end of the left section, and an LED driver located between the cover and the center section, wherein the housing is monolithic and die cast aluminum, the left section and the right section include a plurality of cooling fins, electric power is provided to the left LED assembly by the LED driver, the left lens transmits light from the left LED assembly to thereby illuminate an area under the light fixture, and the right lens transmits light from the right LED assembly to thereby illuminate the area under the light fixture.

Another example of the subject matter described in this disclosure can be implemented by a light fixture. The light fixture can include a housing that includes a left section, a right section, and a center section. The light fixture can also include a cover that is attached to the housing and that covers a component tray of the center section, a right LED assembly in a right LED channel of the right section, a right lens that slides into the right section and that is held in the right section by a closed end of the right section and a right channel cap attached at an open end of the right section, a left LED assembly in a left LED channel of the left section, a left lens that slides into the left section and that is held in the left section by a closed end of the left section and a left channel cap attached at an open end of the left section, and an LED driver located between the cover and the center section, wherein the housing is monolithic and die cast aluminum, wherein housing is a rectangular housing, the left section and the right section include a plurality of cooling fins, the LED driver provides electric power to the left LED assembly, the left lens transmits light from the left LED assembly to thereby illuminate an area under the light fixture, the right lens transmits light from the right LED assembly to thereby illuminate the area under the light fixture, and the center section is configured for attaching a front side of the housing to a back side of a second housing.

Yet another example of the subject matter described in this disclosure can be implemented by a light fixture. The light fixture can include a housing means for housing the light fixture, a left housing means for holding a left LED assembly and a left lens, a right housing means for holding a right LED assembly and a right lens, a power means for electrically powering the left LED assembly and the right LED assembly, a cover means for covering the power, the power means located between the cover means and a center section, and a cooling means for cooling the left LED assembly and the right LED assembly, wherein the cover means is attached to the center section and that covers a component tray of the center section, the housing means is monolithic and is die cast aluminum, and the housing means includes the left housing means, the right housing means, the center section, and the cooling means.

In some implementations of the methods and systems, the LED driver is attached to the cover. In some implementations of the methods and systems, the housing includes a wireway between the component tray and the left LED channel, and a wire passing through the wireway connects the LED driver to the left LED assembly. In some implementations of the methods and systems, the component tray is on a top of the housing and the left LED channel is on a bottom of the left section.

In some implementations of the methods and systems, the light fixture further includes a plurality of lens tabs formed in the housing, wherein the lens tabs are located below the left lens, and the lens tabs prevent the left lens from falling out of the housing. In some implementations of the methods and systems, the light fixture further includes a plurality of left airways located between the left section and the center section, and a plurality of right airways located between the right section and the center section. In some implementations of the methods and systems, the left airways allow air to flow from below the light fixture to above the light fixture via the left airways. In some implementations of the methods and systems, the housing is symmetric across a long axis of the housing. In some implementations of the methods and systems, the left LED assembly includes a plurality of LEDs that are powered by the LED driver and that produce light that the left lens transmits to thereby illuminate the area under the light fixture.

In some implementations of the methods and systems, the light fixture further includes a sensor mount point that is included in the center section, wherein the sensor mount point has a sensor knockout that is configured to be removed from the sensor mount point such that a sensor attached to the sensor mount point passes through the housing. In some implementations of the methods and systems, the center section includes a sensor mount point, a sensor socket is attached to the housing at the sensor mount point, and the sensor mount point and the sensor socket are configured for a sensor to be removably plugged into the sensor socket from below the housing. In some implementations of the methods and systems, the LED driver provides the electric power to the right LED assembly, and the right LED assembly includes another plurality of LEDs that are powered by the LED driver and that produce light that the right lens transmits to thereby illuminate the area under the light fixture. In some implementations of the methods and systems, the housing includes a plurality of cover tabs, and the cover is attached to the housing by the cover tabs. In some implementations of the methods and systems, the housing includes a plurality of cover standoffs, and the cover is attached to the housing by the cover standoffs.

In some implementations of the methods and systems, the center section includes a plurality of bonding bracket mount points configured to attach a bonding bracket to the housing, and attaching the second housing to the bonding bracket while the bonding bracket is attached to the housing attaches the front side of the housing to the back side of the second housing. In some implementations of the methods and systems, the light fixture further includes the bonding bracket and the second housing, wherein the bonding bracket is attached to the bonding bracket mount points of the housing and to the bonding bracket mount points of the second housing. In some implementations of the methods and systems, the light fixture further includes a second light fixture that includes the second housing, wherein the cover covers the component tray of the housing and the component tray of the second housing.

In some implementations of the methods and systems, the light fixture further includes a plurality of lens tabs formed in the housing, a plurality of left airways located between the left section and the center section, and a plurality of right airways located between the right section and the center section, wherein the LED driver is attached to the cover, a wire that passes through a wireway formed in the housing connects the LED driver to the left LED assembly, the component tray is on a top of the housing and the left LED channel is on a bottom of the left section, the lens tabs are located below the left lens the lens tabs prevent the left lens from falling out of the housing, the left airways allow air to flow from below the light fixture to above the light fixture via the left airways, the housing is symmetric across a long axis of the housing, the left LED assembly includes a plurality of LEDs that are powered by the LED driver and that produce light that the left lens transmits to thereby illuminate the area under the light fixture, the center section includes a sensor mount point, the sensor mount point has a sensor knockout that is configured to be removed from the sensor mount point such that a sensor attached to the sensor mount point passes through the housing, a sensor socket is attached to the housing at the sensor mount point, the sensor mount point and the sensor socket are configured for the sensor to be removably plugged into the sensor socket from below the housing, the LED driver provides the electric power to the right LED assembly, the right LED assembly includes another plurality of LEDs that are powered by the LED driver and that produce light that the right lens transmits to thereby illuminate the area under the light fixture, the housing includes a plurality of cover tabs, and the cover is attached to the housing by the cover tabs, and the housing includes a plurality of cover standoffs, and the cover is attached to the housing by the cover standoffs.

These and other aspects will become more fully understood upon a review of the detailed description, which follows. Other aspects, features, and characteristics will become apparent to those of ordinary skill in the art, upon reviewing the following description of specific examples in conjunction with the accompanying figures. While features may be discussed relative to certain examples and figures below, all examples may include one or more of the advantageous features discussed herein. In other words, while one or more examples may be described as having certain advantageous features, one or more of such features may be included in any of the examples discussed herein. In similar fashion, while the examples may be discussed below as a device, a system, or a method, the examples may be implemented in various devices, systems, and methods.

BRIEF DESCRIPTION OF THE DRAWINGS

FIG. 31 is an illustration showing the bottom of a light fixture with a sensor, according to some aspects.

FIG. 32 is an illustration of an exploded view of a light fixture, according to some aspects.

FIG. 33 is an illustration of an internal circuit of a light fixture, according to some aspects.

FIG. 34 is an illustration of an exploded view of a dual light fixture, according to some aspects.

FIG. 35 is an illustration of a bonding bracket, according to some aspects.

FIG. 36 is an illustration of an internal circuit of a dual light fixture, according to some aspects.

FIG. 37 is an illustration of an exploded view of a triple light fixture, according to some aspects.

FIG. 38 is an illustration of an internal circuit of a triple light fixture, according to some aspects.

FIG. 39 is an illustration of an LED assembly, according to some aspects.

FIG. 40 is an illustration of a wire guard for a lighting fixture, according to some aspects.

FIG. 41 is an illustration of an emergency backup for a lighting fixture, according to some aspects.

FIG. 42 is an illustration of an internal circuit of a light fixture with an emergency backup, according to some aspects.

Throughout the description, similar reference numbers may be used to identify similar elements.

DETAILED DESCRIPTION

Figure 1:
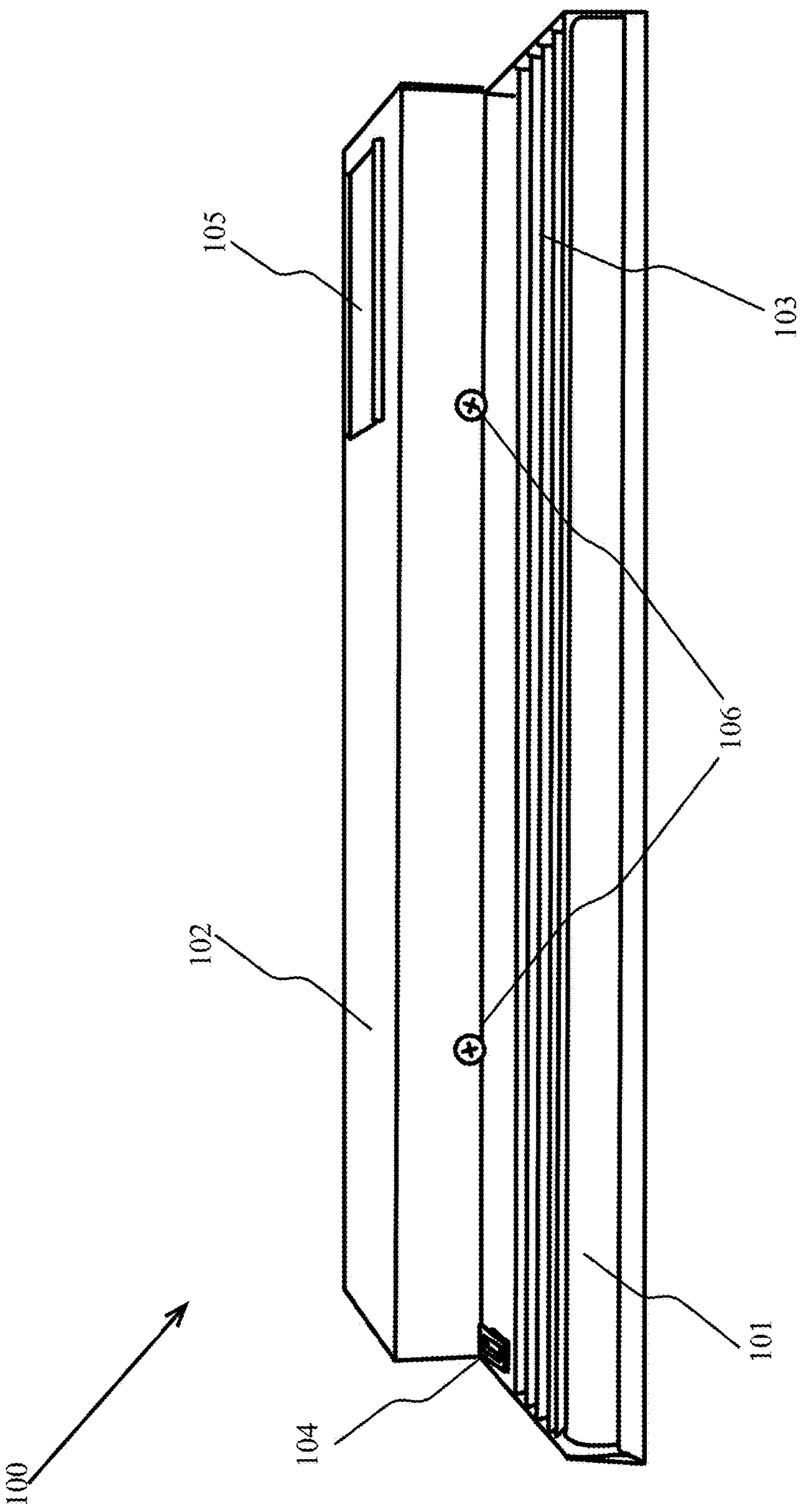
FIG. 1 is an illustration of the left side of a light fixture, according to some aspects.

It will be readily understood that the examples and aspects of the examples generally described herein and illustrated in the appended figures could be arranged and designed in a wide variety of different configurations. Thus, the following more detailed description and the figures are not intended to limit the scope of the present disclosure, but merely present illustrative examples. The drawings are not necessarily drawn to scale unless specifically indicated. The described examples are to be considered in all respects only as illustrative and not restrictive. The scope of the claims is therefore indicated by the claims themselves rather than this detailed description or the drawings. All changes which come within the meaning and range of equivalency of the claims are to be embraced within their scope.

Reference throughout this specification to features, advantages, or similar language does not imply that all the features and advantages that may be realized should be or must be in any single example. Rather, language referring to the features and advantages is understood to mean that a specific feature, advantage, or characteristic described in an example is included in that example and possibly in other examples. Thus, discussions of the features and advantages, and similar language, throughout this specification may, but do not necessarily, refer to the same example.

Furthermore, the described features, advantages, characteristics, and aspects may be combined in any suitable manner in one or more examples. One skilled in the relevant art will recognize, in light of the description herein, that one or more of the features, advantages, characteristics, or aspects may be omitted from some examples. Other examples may include additional features and advantages.

The light fixtures described herein are highly efficient and robust high bay fixtures. Two similar designs are presented. A high bay fixture and a large high bay (LHB) fixture. The high bay fixture is approximately 360 mm long, 260 mm wide, and 48.5 mm high. As such, the high bay fixture is a low profile fixture and has a profile that is less than 0.135 ($48.5/360<0.135$). The LHB fixture is approximately 500 mm long, 320 mm wide, and 48.5 mm high. As such, the LHB fixture is a low profile fixture and has a profile that is less than 0.1 ($48.5/500<0.1$).

The housings of the high bay fixture and the large high bay (LHB) fixture are formed as a single piece of die cast aluminum. A die casting process has been used to form the housings. Each housing has a left section, a right section, and a center section that is between the left section and the right section. The right section includes a right LED channel. The left section includes a left LED channel. The center section includes a component tray. The entire housing therefore acts as a heat spreader. The LED driver, which powers the LED assemblies in the LED channels, may be attached to a cover that covers the component tray instead of being attached directly to the housing. As such, heat generated by the LEDs is spread through and dissipated by the housing while heat generated by the LED driver is spread through and dissipated by the cover to which the LED driver is attached. This arrangement cools the LEDs better than other arrangements (e.g., an arrangement where the LEDs and LED driver share a heat sink; an arrangement where little, if any, of the heat from the LEDs is conducted to the component tray, etc.). It is well known that heat is the enemy of LED longevity and efficiency. The housings used by the high bay and the large high bay (LHB) fixtures may therefore have higher efficiency and longer life than other competing fixtures.

Another factor providing higher efficiency and longer life is that the high bay fixture and the LHB fixture have higher voltage LED drivers than competing products. As such, the high bay and LHB fixtures are designed for Underwriter Laboratories (UL) class 1 certification whereas competing devices are UL class 2 devices. The high voltage LED drivers allow the high bay and LHB fixtures to have higher efficacy while generating less heat. Efficacy is defined as the ratio of output lumens per input watts of electric power. The requirements for UL class 1 are more stringent than for UL class 2. As such, the high bay and LHB fixtures are designed to meet more stringent safety requirements than competing products. The result is that the high bay and LHB fixtures have higher efficacy and are more reliable than competing products. Furthermore, the high bay and LHB fixtures produce more than 140 lumens per square inch, which is greater than competing products.

Certain design elements of the high bay and LHB fixtures are incorporated to ensure the fixtures meet the requirements of UL class 1. For example, the fixtures have wireway covers over the wireways between the component tray and the LED channels. The wireways and wireway covers are small. The wireways are approximately 20 mm long, 5.6 mm wide, and 7.7 mm high. The wireway covers are approximately 25 mm long, 6 mm high, and 8 mm wide.

Another factor is the weight of the fixture because electricians and facility personnel are often tasked with installing and replacing fixtures. The high bay and the LHB fixtures produce more than 5900 lumen/pound. For example, the high bay fixture produces 21000 lumens and weighs less than 3.6 lb. (current units weigh 3.55 lb.).

The high bay and LHB fixtures must dissipate heat from the LEDs. The housings of the fixtures therefore have cooling fins on the top surface of the housing and above the LED channels. The cooling fins may be parallel to the long axis of the housing which is also parallel to the long axis of the LED chambers. The high bay housing has cooling fins that are 2.5 mm high. The LHB housing has cooling fins that are 18 mm high.

The housings are designed to be joined end-to-end to thereby produce longer fixtures. Each of the housings has bonding bracket mount points. A bonding bracket can attach the back side of one housing to the front side of another housing. Bonding brackets can be attached to the bonding bracket mount points of two housings that are positioned end to end, thereby attaching the housings. Two housings attached end to end can be used for a dual/doubled fixture. Three housing attached end to end can be used for a triple/tripled housing. A single housing fixture has two LED assemblies. A dual fixture has four LED assemblies. A triple fixture has 6 LED assemblies. The dual fixture can have a single LED driver, a single cover (e.g., dual housing cover 146 illustrated in FIG. 34) and two long lenses that each span both housings (e.g., dual housing lens 147 illustrated in FIG. 34). The triple fixture can have two LED drivers (e.g., LED driver 124 and second LED driver 153 illustrated in FIG. 37), a single cover (e.g., triple housing cover 151 illustrated in FIG. 37) and two long lenses that each span all three housings (e.g., triple housing lens 152 illustrated in FIG. 37).

FIGS. 1-8 are illustrations of a light fixture 100 that is a high bay fixture. The lighting fixture has a housing 101 that is a monolithic die cast aluminum housing. A cover 102 is attached to the housing 101 by cover screws 106 that are threaded into cover tabs 113 (not shown) that are part of the monolithic housing 101. A cover door 105 provides access to a component space that is enclosed by the cover 102. Cooling fins 103 are on the top of the left section and the right section of the housing 101. Wireways provide a pathway for wires to carry power from an LED driver in the component space to the LED assemblies in the LED channels. A wireway cover 104 covers the wireway. The LED driver can provide electric power to an LED assembly via a wire that connects the LED driver to the LED assembly.

Figure 2:
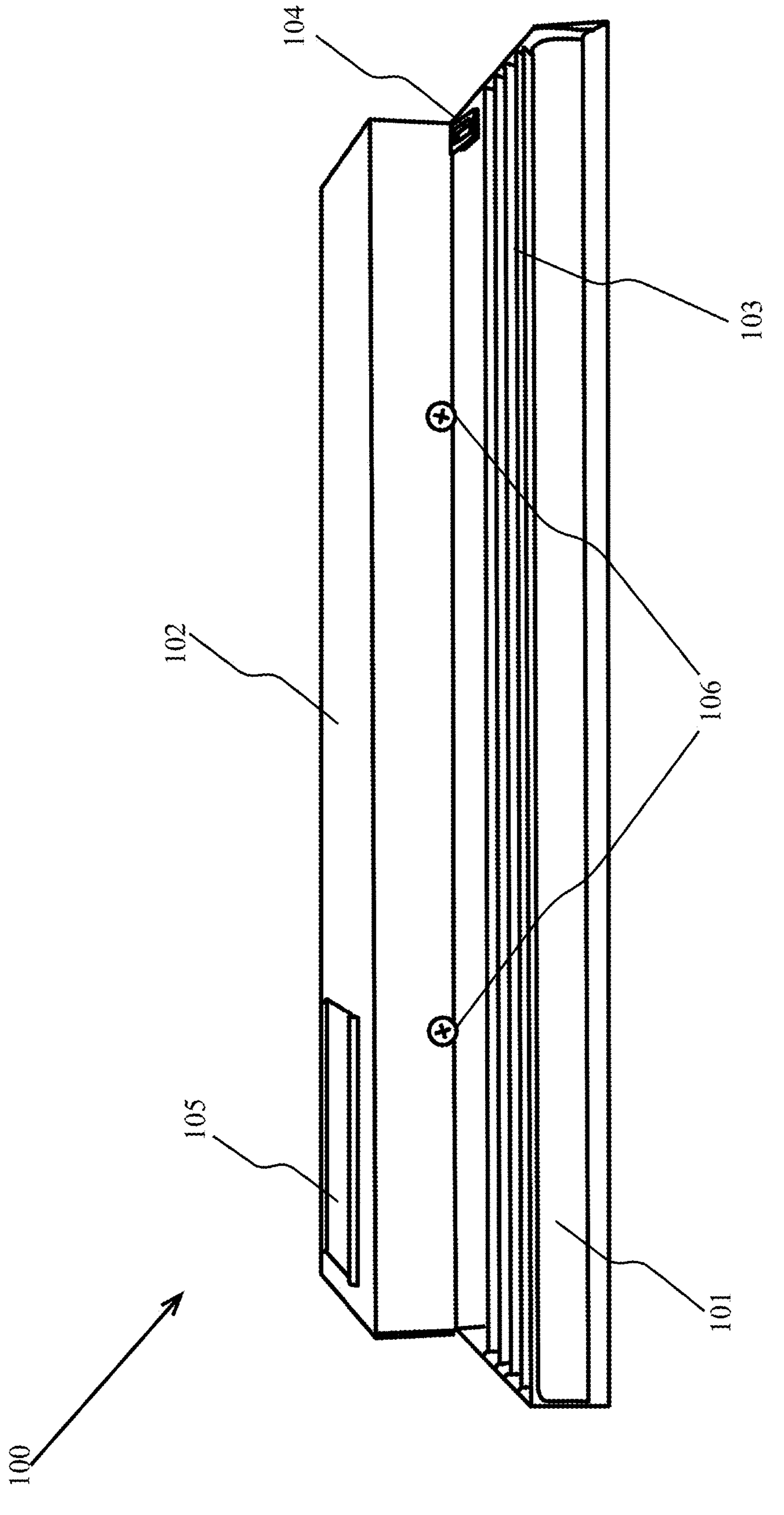
FIG. 2 is an illustration of the right side of the light fixture illustrated in FIG. 1, according to some aspects.
Figure 3:
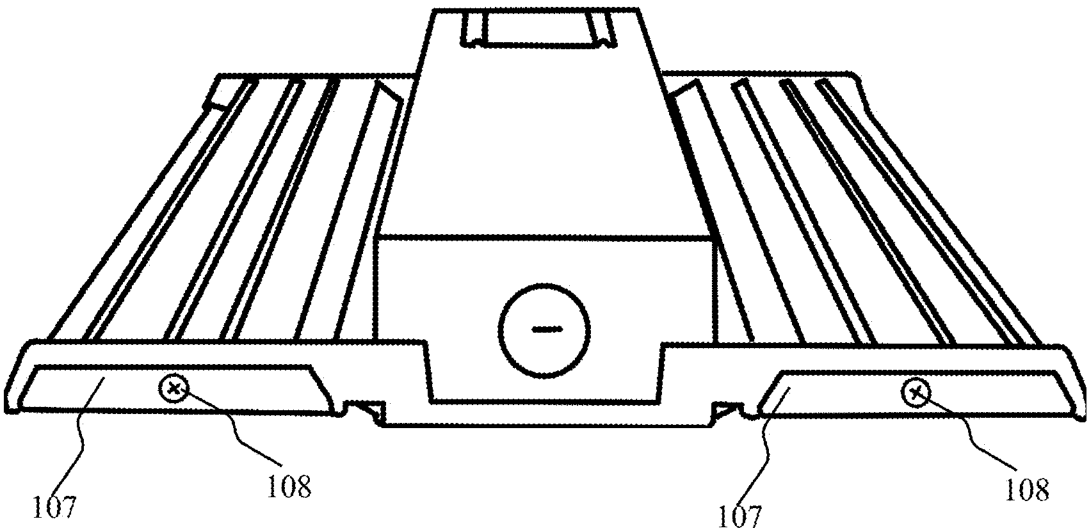
FIG. 3 is an illustration of the back of the light fixture illustrated in FIGS. 1-2, according to some aspects.

FIG. 3 is an illustration of the back of the light fixture 100 illustrated in FIGS. 1-2, according to some aspects. The LED channels can have closed ends and open ends. An open end of the LED channels can be located at the back end of the housing 101. A lens slides into a LED channel through the open end. The lens transmits light produced by an LED assembly in the LED channel to an area below the light fixture. Channel caps 107 prevents the lenses from sliding back out of the LED channels via the open ends. The channel caps 107 are attached to the housing by channel cap screws 108. A left channel cap is attached to the left section. A right channel cap is attached to the right section.

Figure 4:
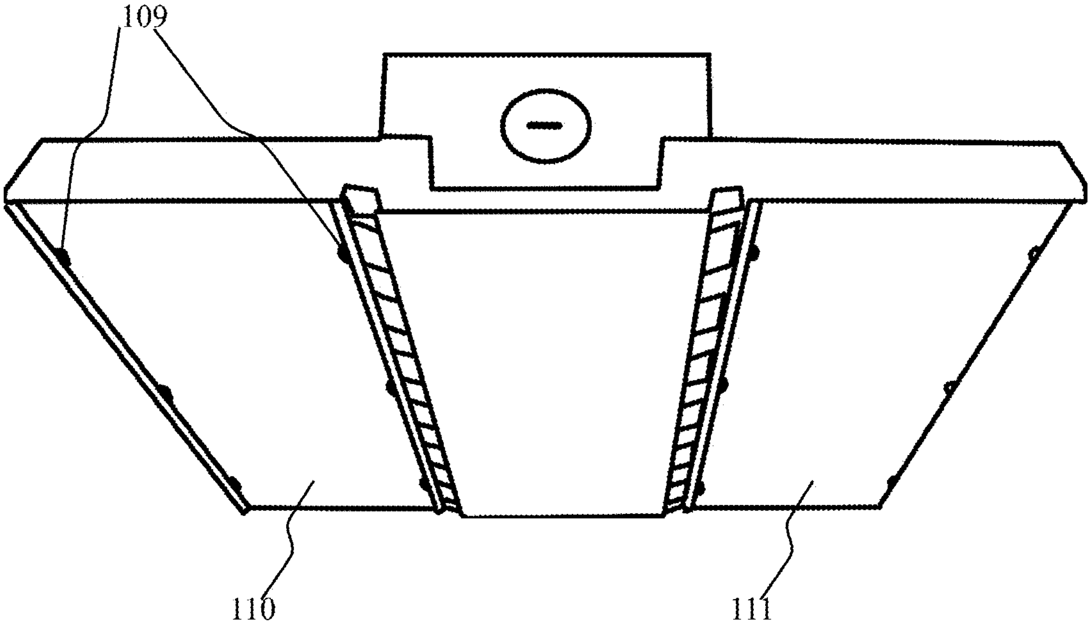
FIG. 4 is an illustration of the front of the light fixture illustrated in FIGS. 1-3, according to some aspects.

FIG. 4 is an illustration of the front of the light fixture 100 illustrated in FIGS. 1-3, according to some aspects. A closed end of the LED channel can be located at the front end. A closed end of a LED channel is an end where the housing is formed to prevent the lens from sliding out of the LED channel via the closed end. FIG. 4 shows a left lens 110 in the left LED channel of the housing and a right lens 111 in the right LED channel of the housing. Lens tabs 109 prevent the lens from falling out of the light fixture.

Figure 5:
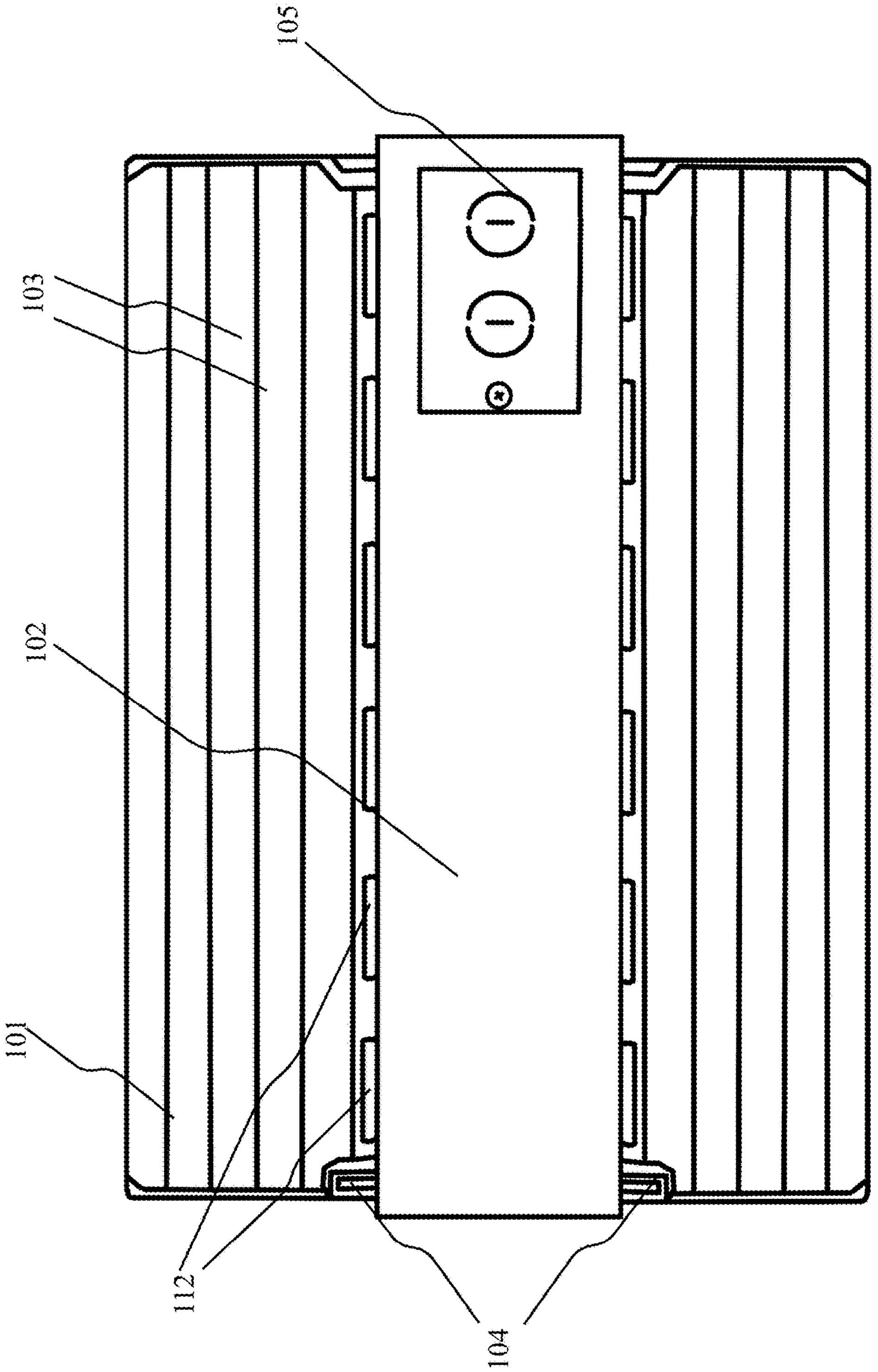
FIG. 5 is an illustration of the top of the light fixture illustrated in FIGS. 1-4, according to some aspects.

FIG. 5 is an illustration of the top of the light fixture 100 illustrated in FIGS. 1-4, according to some aspects. In this view, wireway covers 104 can be seen on either side of the center section of the housing. Airways 112 can also be seen on either side of the center section. The airways that are located between the left section and the center section are the left airways. The airways that are located between the right section and the center section are the right airways. The airways allow air to flow from below the light fixture to above the light fixture via the airways.

Figure 6:
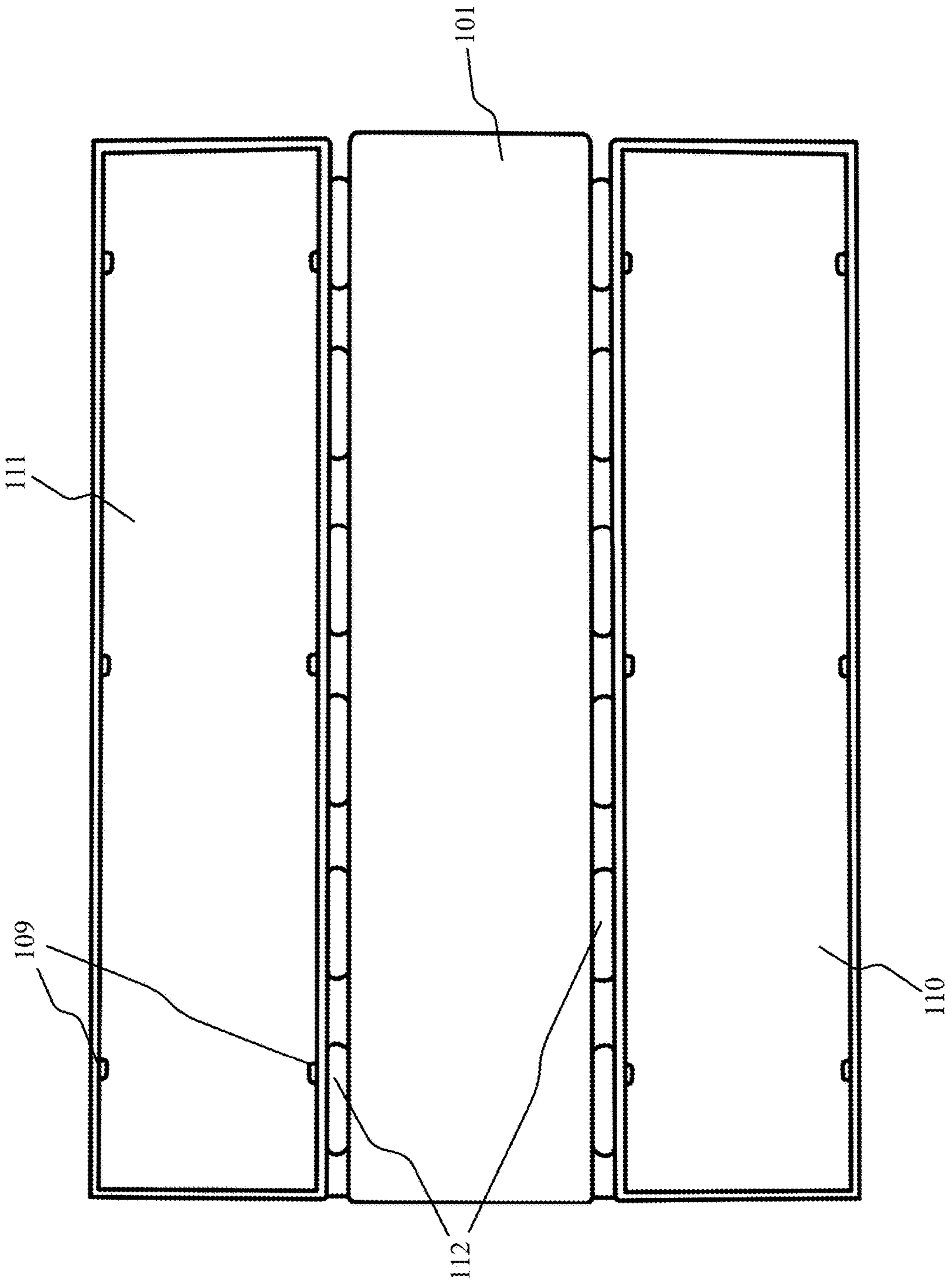
FIG. 6 is an illustration of the bottom of the light fixture illustrated in FIGS. 1-5, according to some aspects.
Figure 7:
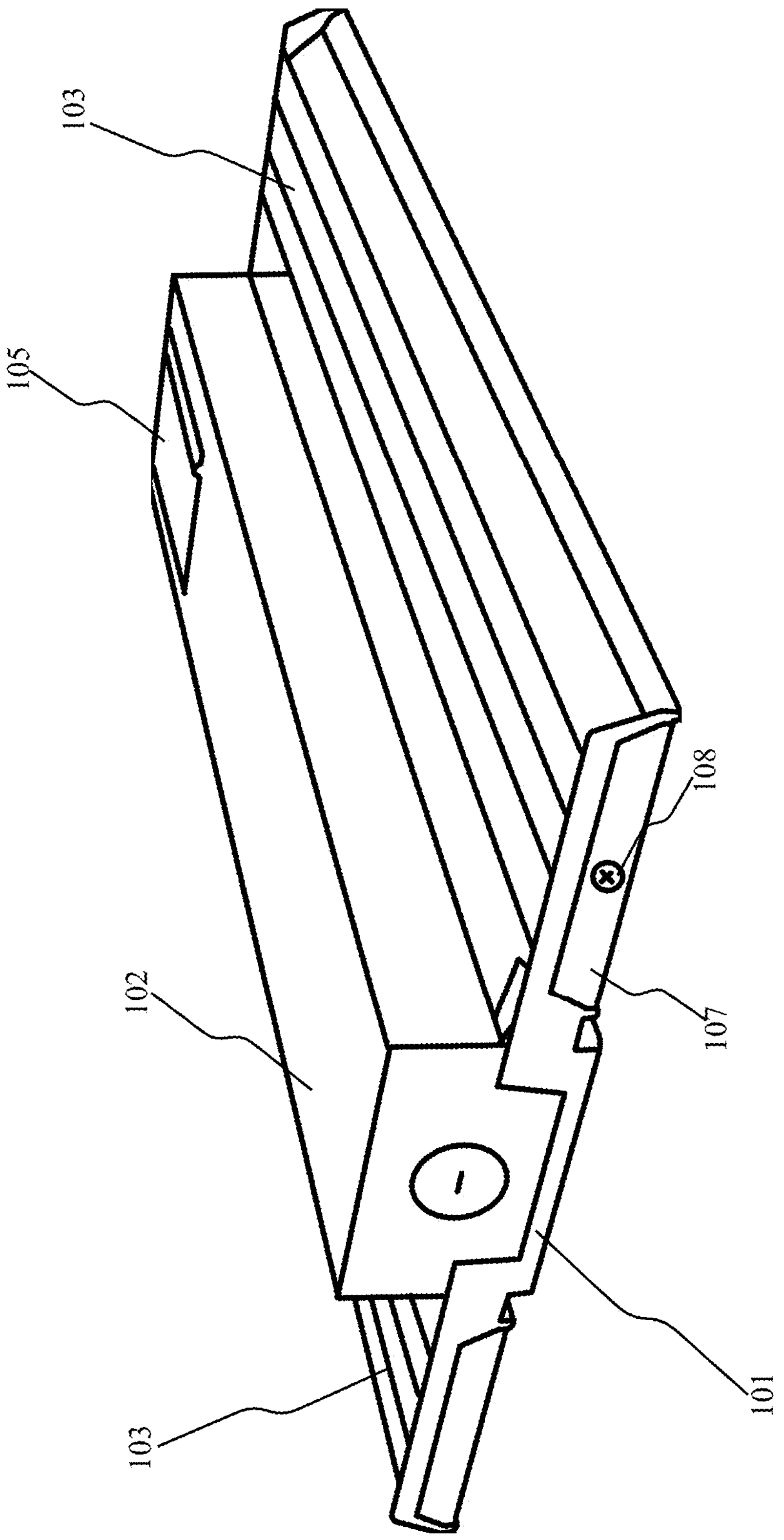
FIG. 7 is an illustration of the light fixture illustrated in FIGS. 1-6 from a top perspective view, according to some aspects.
Figure 8:
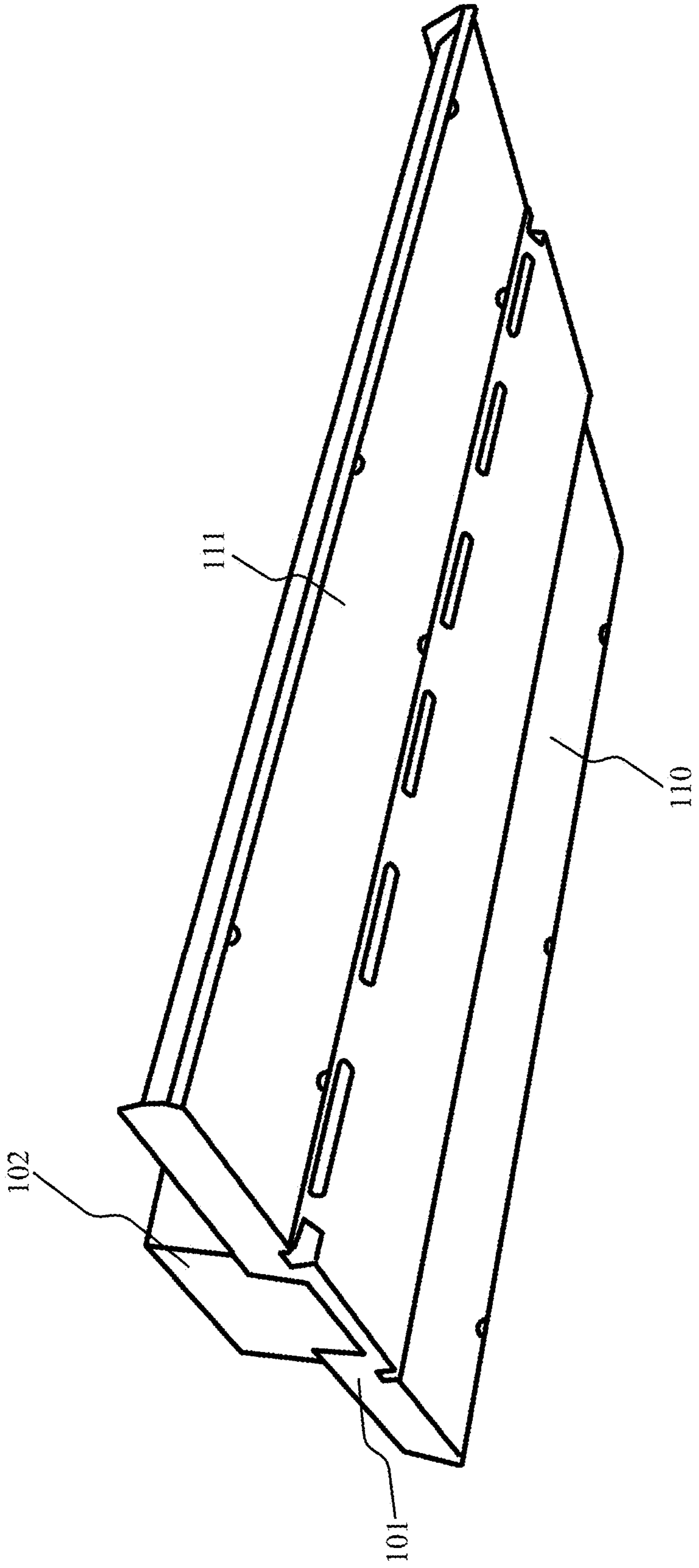
FIG. 8 is an illustration of the light fixture illustrated in FIGS. 1-7 from a bottom perspective view, according to some aspects.

FIG. 6 is an illustration of the bottom of the light fixture 100 illustrated in FIGS. 1-5, according to some aspects. FIG. 6 provides a good view of the lens tabs 109 holding the left lens 110 and the right lens 111 in the housing.

FIGS. 9-17 are illustrations of the housing 101 of the light fixture 100 illustrated in FIGS. 1-8. The housing 101 is a monolithic housing that can be formed as a single piece of aluminum via a die casting process. The housing 101 is formed with cover tabs 113 for holding a cover 102 over the component tray 120 of the center section 121. The component space is the space that is enclosed by the cover 102 and the component tray 120.

Figure 9:
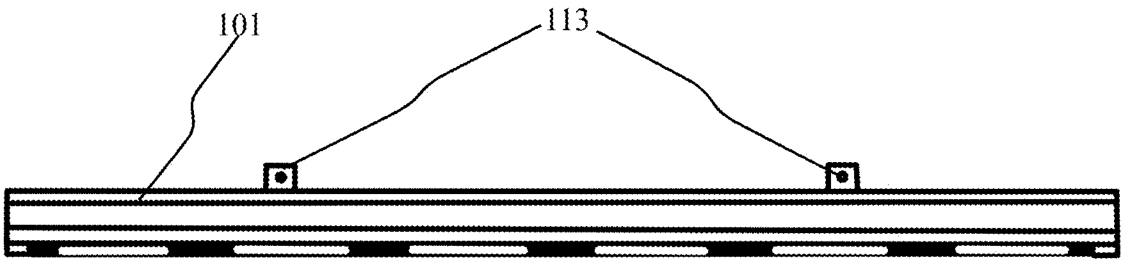
FIG. 9 is an illustration of the left side of a housing of the light fixture illustrated in FIGS. 1-8, according to some aspects.
Figure 10:
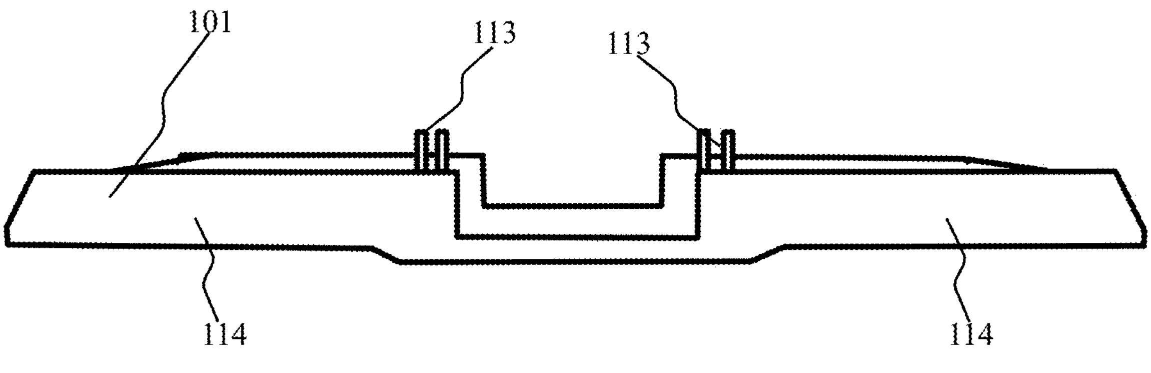
FIG. 10 is an illustration of the front of the housing illustrated in FIG. 9, according to some aspects.

FIG. 10 is an illustration of the front of the housing illustrated in FIG. 9, according to some aspects. There are closed ends 114 formed into the housing that can prevent lenses from sliding out of the housing via the front of the housing 101. Four cover tabs 113 are visible in this non-isometric view.

Figure 11:
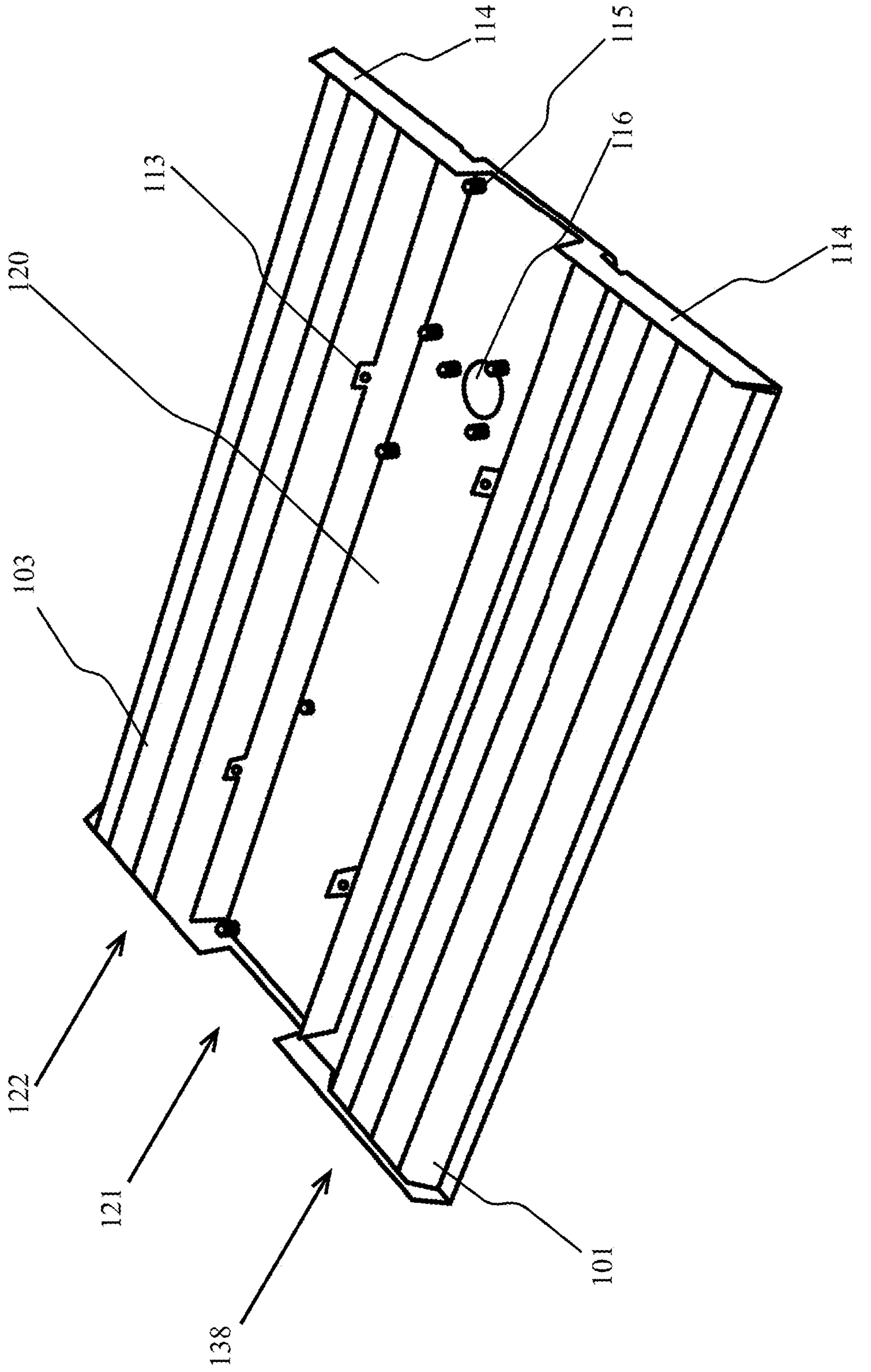
FIG. 11 is an illustration of the housing illustrated in FIG. 9-10 from a top perspective view, according to some aspects.

FIG. 11 is an illustration of the housing 101 illustrated in FIG. 9-10 from a top perspective view, according to some aspects. The left section 138, the center section 121 and the right section 122 of the housing 101 are clearly visible. Bonding bracket mount points 115 and a sensor mount point 116 are visible inside the component tray 120. The bonding bracket mount points 115 and the sensor mount point 116 can be formed during the die casting process that forms the housing 101.

Figure 12:
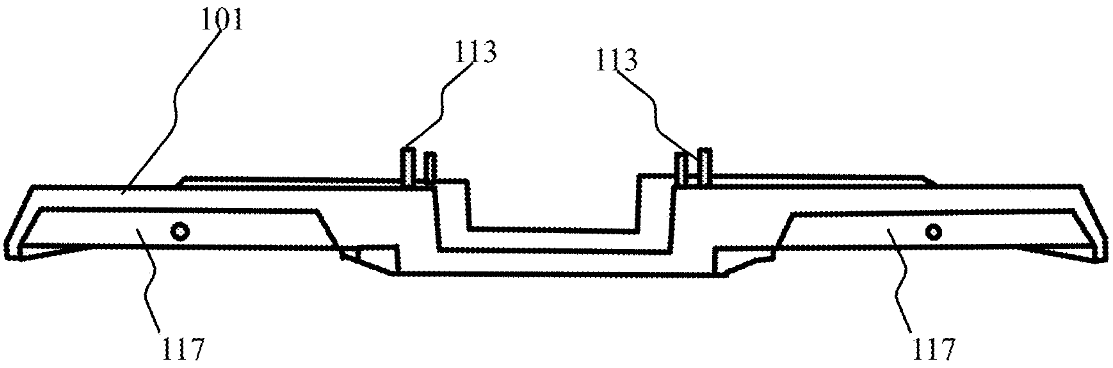
FIG. 12 is an illustration of the back of the housing illustrated in FIG. 9-11, according to some aspects.

FIG. 12 is an illustration of the back of the housing 101 illustrated in FIG. 9-11, according to some aspects. The LED channels are shown with open ends 117 on the back side. The open ends 117 can be formed in the housing 101 during the die casting process that forms the housing. Lenses can slide into and out of the LED channels via the open ends 117.

Figure 13:
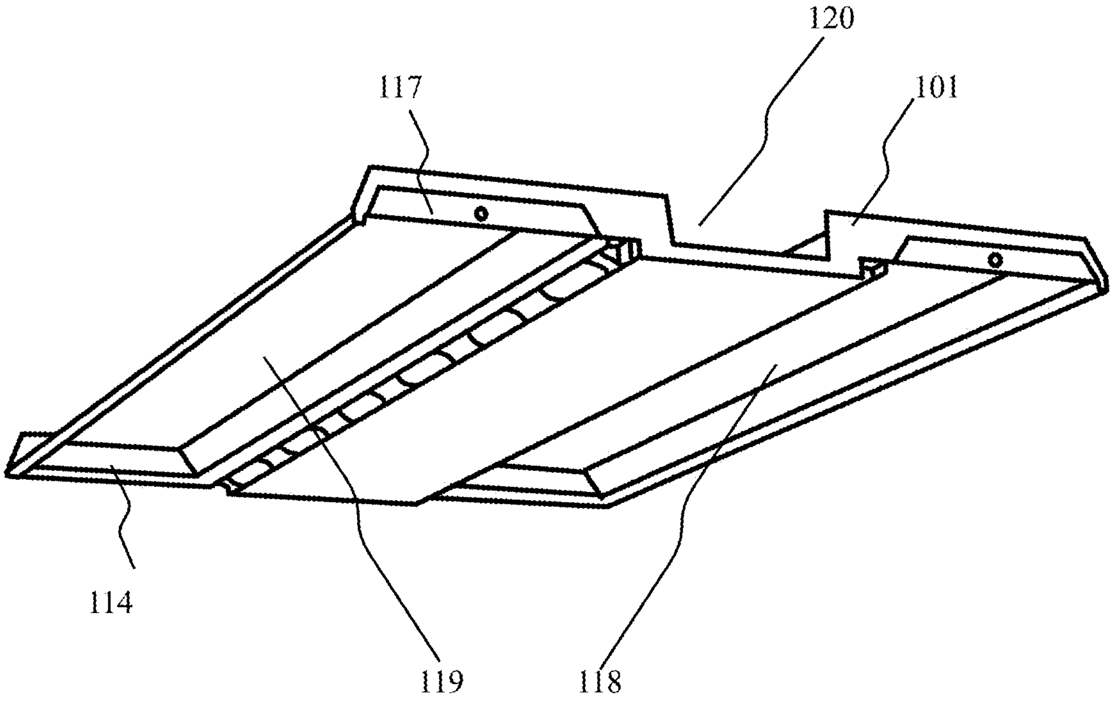
FIG. 13 is an illustration of the housing illustrated in FIG. 9-12 from a bottom perspective view, according to some aspects.

FIG. 13 is an illustration of the housing 101 illustrated in FIG. 9-12 from a bottom perspective view, according to some aspects. The left LED channel 118 and the right LED channel 119 can be seen in this view.

Figure 14:
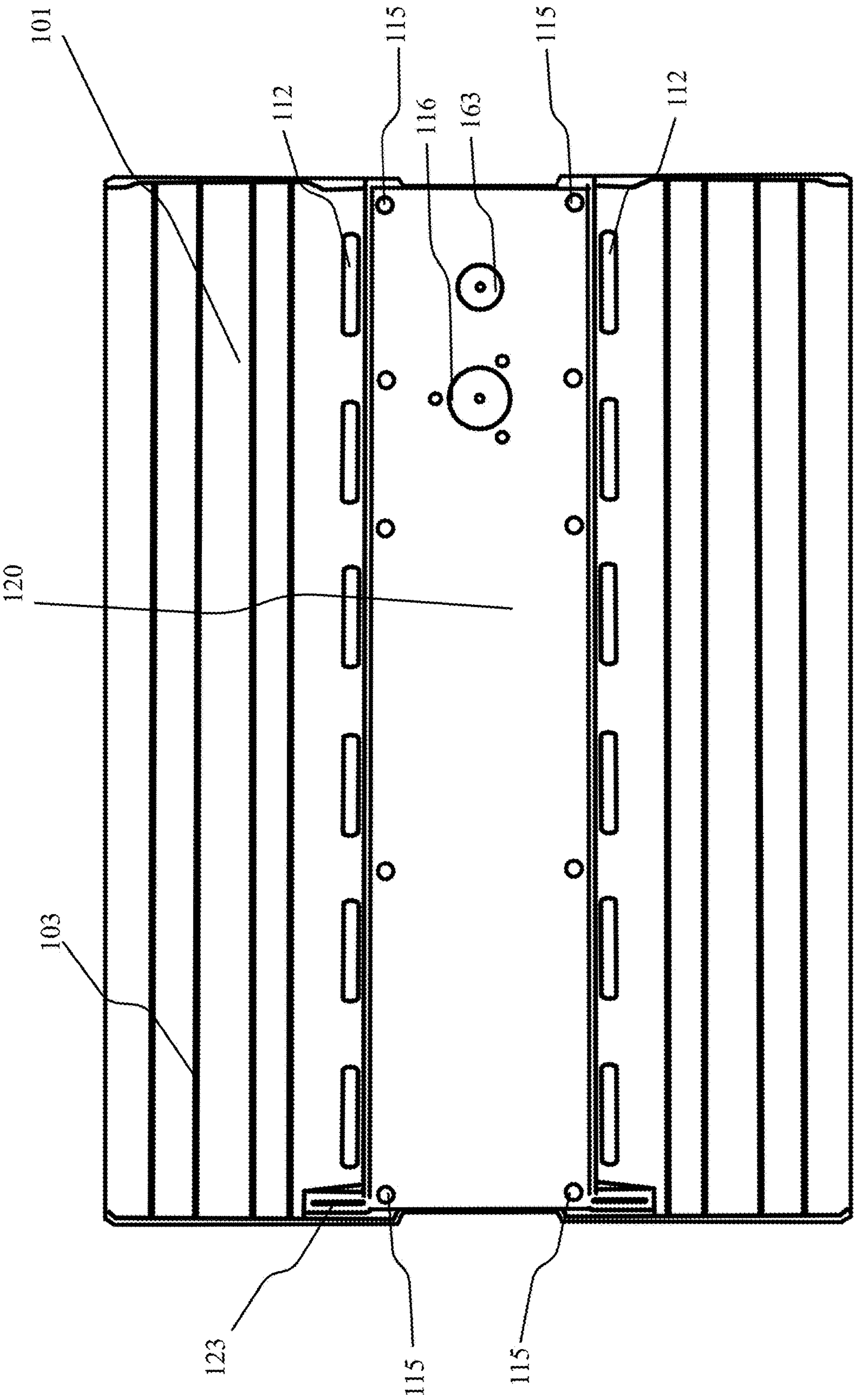
FIG. 14 is an illustration of the top the housing illustrated in FIG. 9-13, according to some aspects.

FIG. 14 is an illustration of the top the housing 101 illustrated in FIG. 9-13, according to some aspects. Wireways 123 are visible in this view. The wireways 123 provide paths for wires to pass between the component tray 120, the right LED channel 119, and the left LED channel 118. The bonding bracket mount points can be raised sections or standoffs to which bonding brackets can be attached. A bonding bracket attaches two housings end to end. The wireways 123 and the bonding bracket mount points 115 can be formed in the housing 101 during the die casting process that forms the housing. A test and Indicator knockout 163 can be knocked out such that a text and indicator unit can be installed in the fixture.

Figure 15:
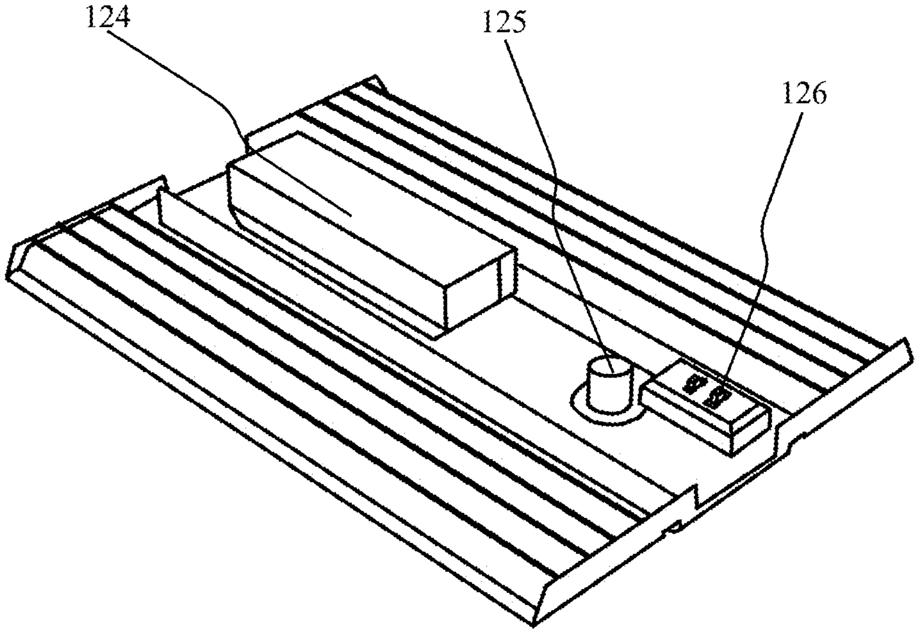
FIG. 15 is an illustration of the housing illustrated in FIG. 9-14 and some light fixture components, according to some aspects.

FIG. 15 is an illustration of the housing 101 illustrated in FIG. 9-14 and some light fixture components, according to some aspects. A sensor socket 125 and a sensor controller

Figure 16:
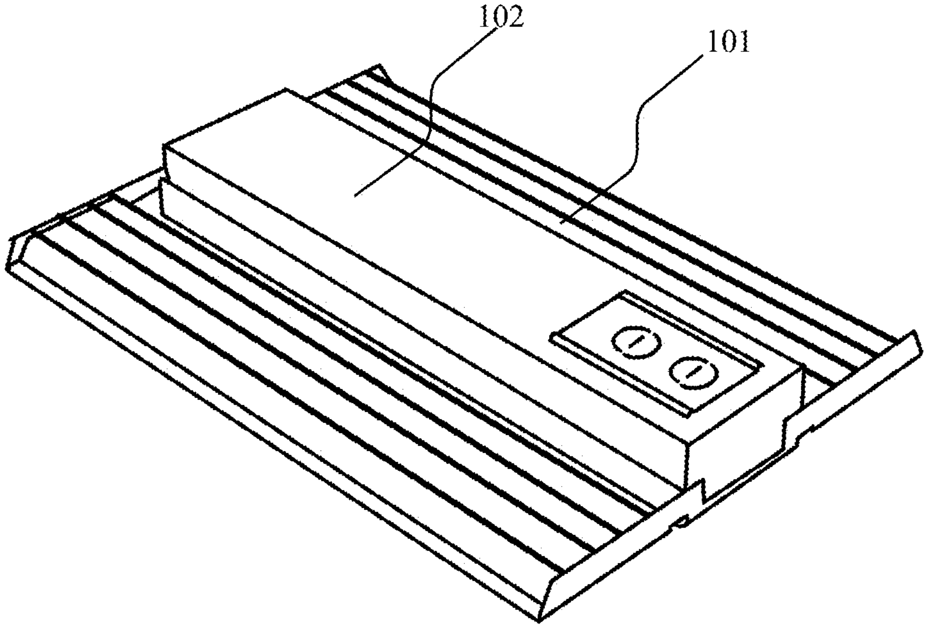
FIG. 16 is an illustration of the housing of FIG. 15 with a cover over the light fixture components, according to some aspects.

126 can be attached inside the component tray 120 to the housing 101. The sensor mount point 116 is configured such that the center of the sensor mount point 116 is a sensor knockout that can be knocked out to leave a hole. The sensor socket 125 can be attached to the sensor mount point 116 such that sensors can be slid through the hole in the sensor mount point and socketed into the sensor socket 125. A sensor that is plugged into the sensor socket is removably plugged into the sensor socket. FIG. 16 is an illustration of the housing 101 of FIG. 15 with a cover 102 over the light fixture components, according to some aspects. Those familiar with light fixtures or general electrical work (e.g., licensed electricians) are familiar with knockouts. The LED driver 124 is not attached to the housing because, in this design, LED drivers are attached to the cover. The LED driver is shown to provide its location. Various types of sensors (motion sensor, microwave, light sensor, etc.) may be plugged into the sensor socket. The sensor controller can be used to control the fixture's light output based on the sensor output. For example, the fixture may turn on at a 50% level (or some other preset level) when motion is detected.

Figure 17:
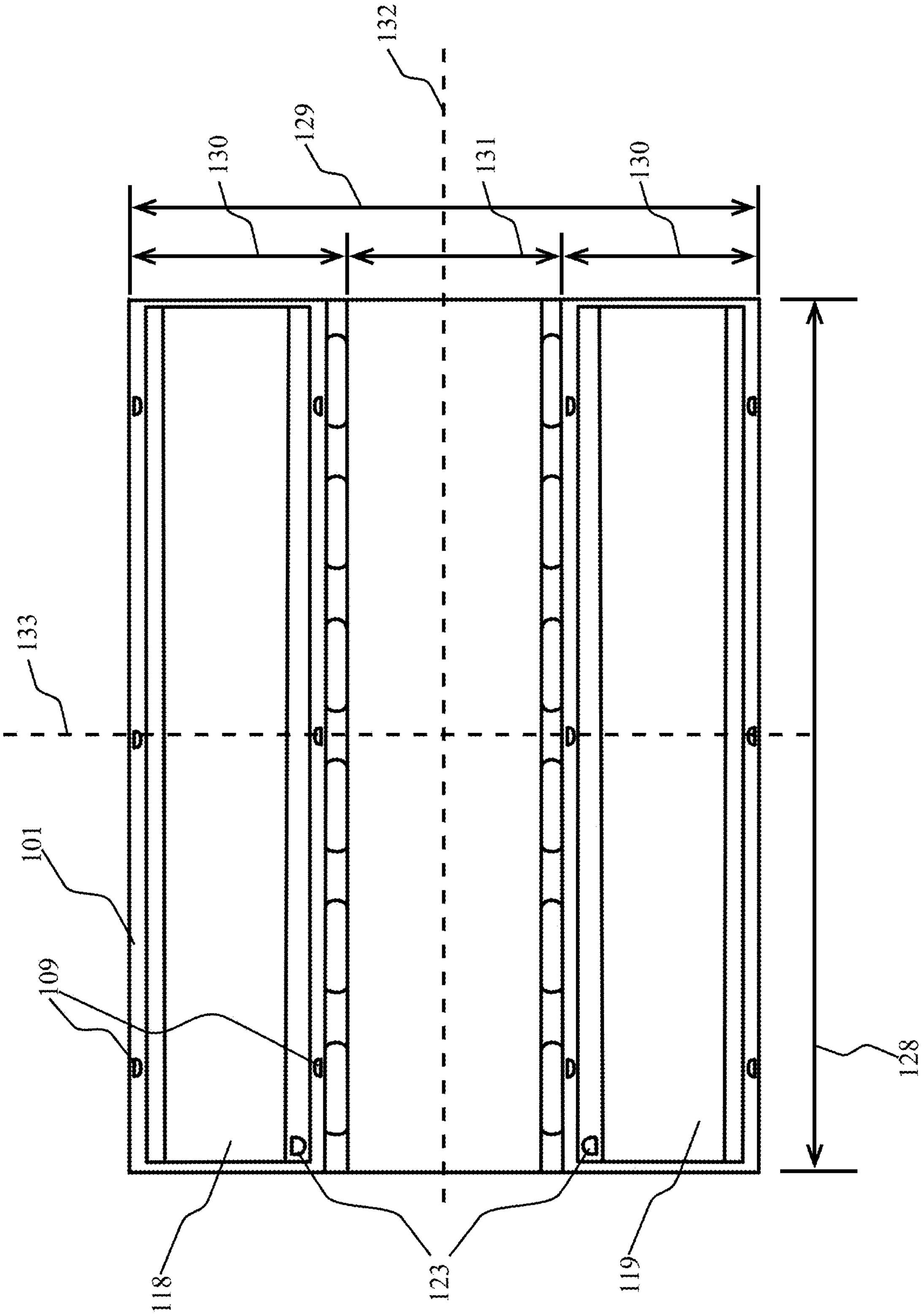
FIG. 17 is an illustration of the bottom of the housing illustrated in FIG. 9-16, according to some aspects.

FIG. 17 is an illustration of the bottom of the housing 101 illustrated in FIG. 9-16, according to some aspects. The housing 101 has a housing length 128 and a housing width 129. The housing shown in FIG. 17 is for a high bay fixture that has a housing length 128 that is nominally 360 mm and a housing width 129 that is nominally 260 mm. A large high bay (LHB) fixture is also disclosed herein. The LHB fixture has a housing length 128 that is nominally 500 mm and a housing width 129 that is nominally 320 mm. The housing has a long axis 132 and a short axis 133. The right section 122 is on the right side of the long axis 132 and the left section 138 is on the left side of the long axis 132. The housing can be symmetric about the long axis 132. The short axis 133 is perpendicular to the long axis 132 and is centered between the front of the housing and the back of the housing. The left section 138 and the right section 122 have a left/right section width 130. The center section 121 has a center section width 131. For the LHB fixture, the left/right section width 130 is nominally 109 mm and the center section width 131 is nominally 102 mm.

Figure 18:
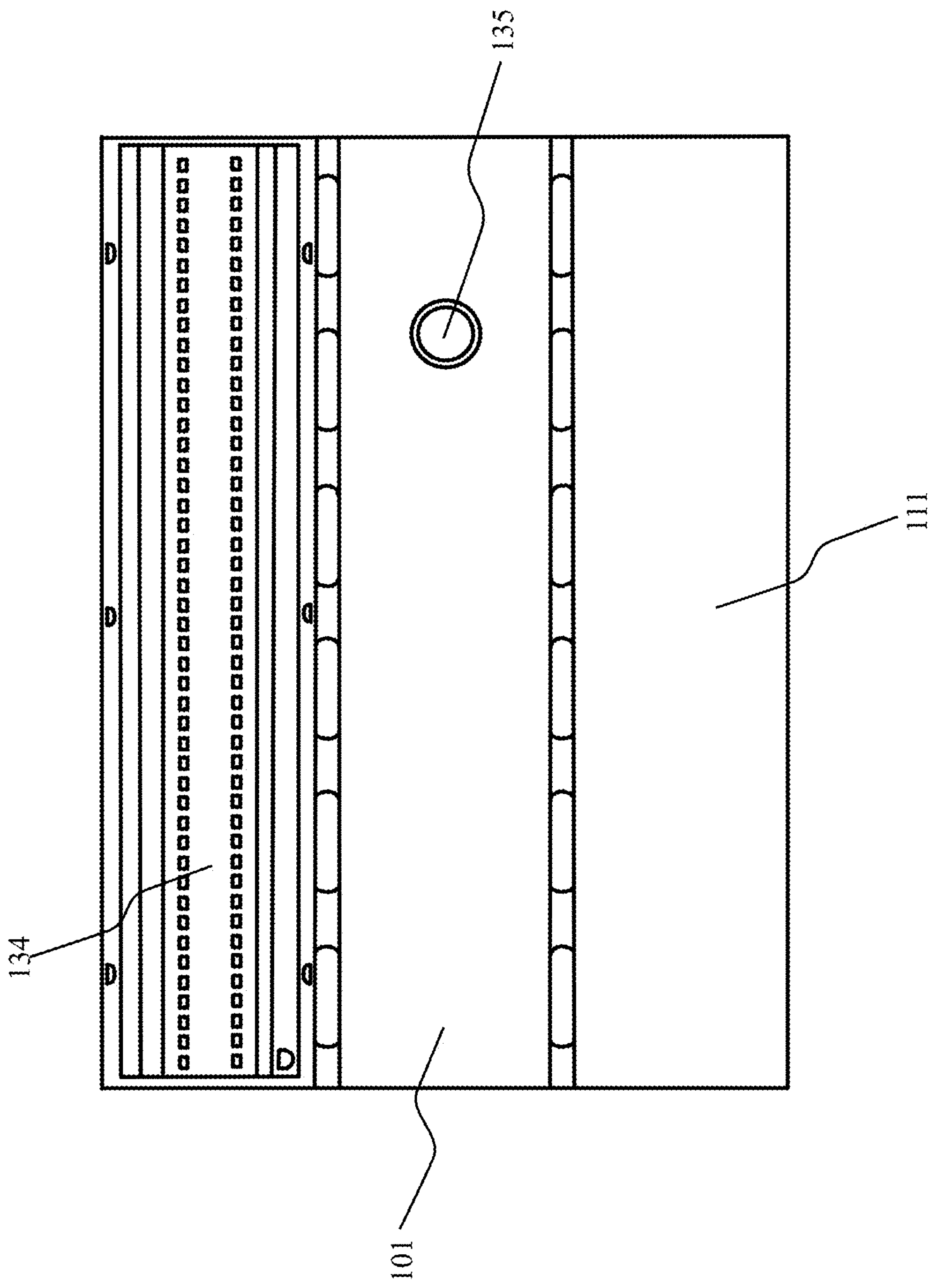
FIG. 18 is an illustration of the bottom of the light fixture illustrated in FIGS. 1-8 with a lens removed, according to some aspects.

FIG. 18 is an illustration of the bottom of the light fixture illustrated in FIGS. 1-8 with a lens removed, according to some aspects. The sensor knockout 135 is visible in the center section. The right lens 111 is shown, but the left lens 110 is removed. One of the LED assemblies, the left LED assembly 134, can be seen in the left LED channel 118.

Figure 19:
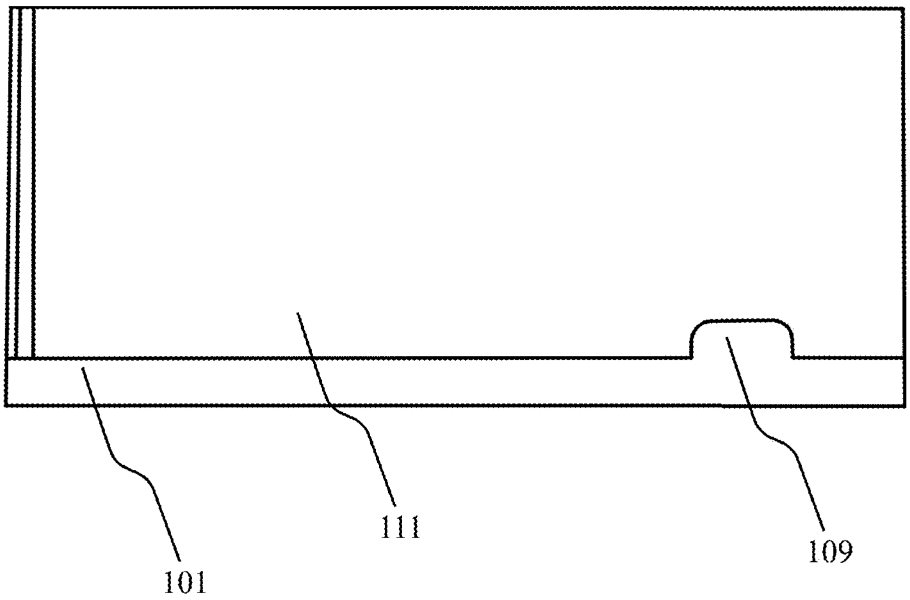
FIG. 19 is an illustration of a lens tab, according to some aspects.

FIG. 19 is an illustration of a lens tab 109, according to some aspects. The lens tab 109 is seen to be holding the right lens 111 in the housing 101. FIG. 19 shows a close up of the LED tab 109 holding a lens in the housing 101. The lens may be installed by sliding the lens under the LED tabs above the LED channels. An LED channel has an open end and a closed end. The lens may be slid over the LED channel and under the LED tabs from the open end. A channel cap may then be installed in the open end of the LED channel to prevent the lens from sliding back out. The lens is then held in place by the LED tabs. The channel cap, and the closed end of the LED channel.

Figure 20:
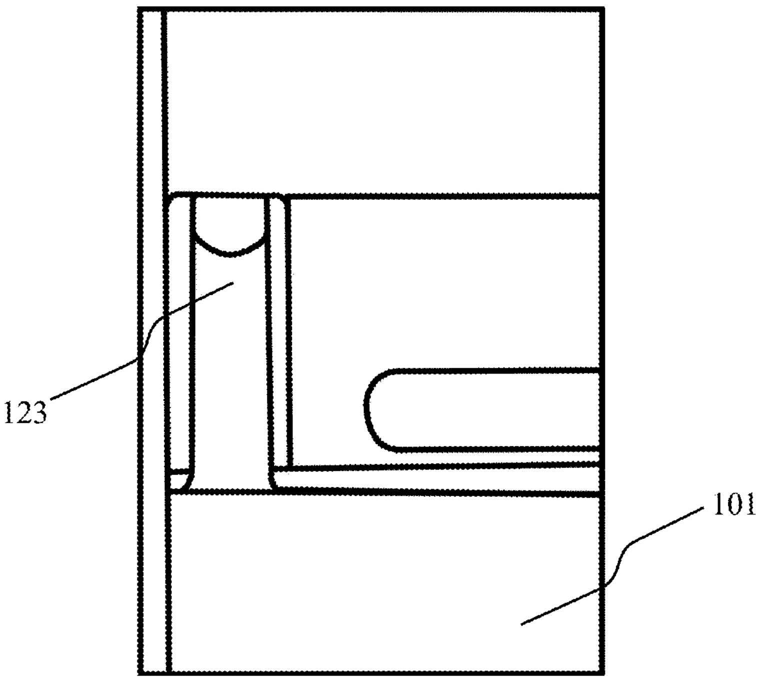
FIG. 20 and FIG. 21 are illustrations of a wireway, according to some aspects.
Figure 21:
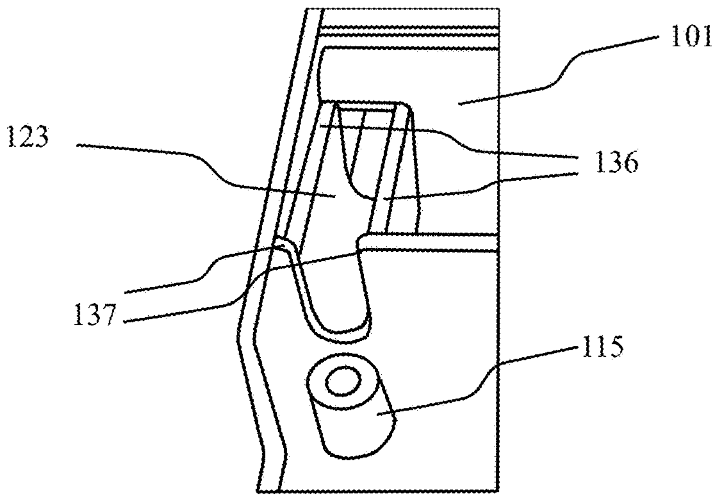
Figure 22:
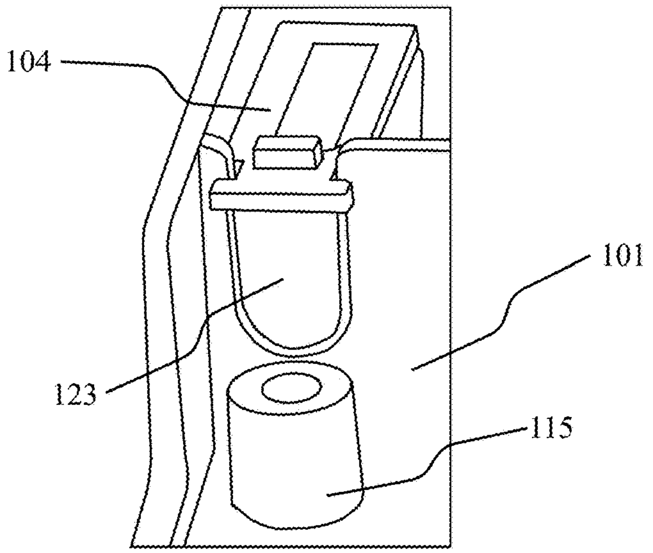
FIG. 22 is an illustration of a wireway cover in a wireway, according to some aspects.

FIG. 20 and FIG. 21 are illustrations of a wireway 123, according to some aspects. The views shown in FIGS. 20-21 are from the component tray 120 and the opening into the LED channel on the other side can be seen. The wireway 123 has a wireway top edge 136 and wireway cover engagements 137. FIG. 22 is an illustration of a wireway cover 104 in a wireway 123, according to some aspects.

Figure 23:
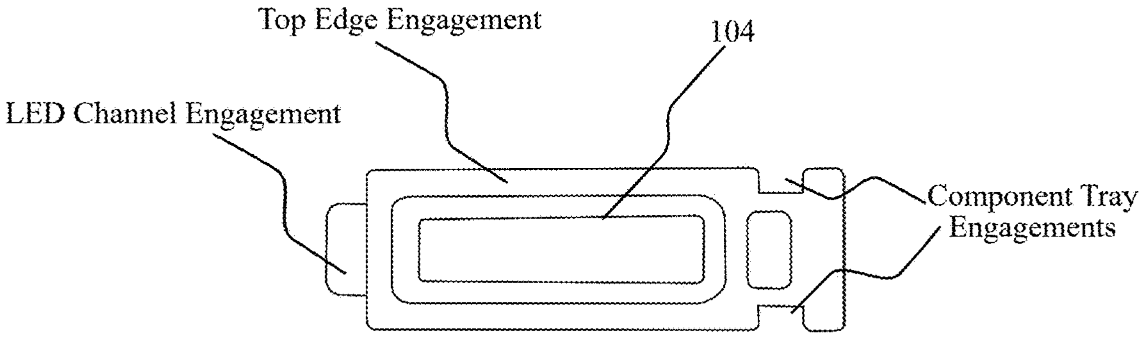
FIG. 23 and FIG. 24 are illustrations of a wireway cover, according to some aspects.
Figure 24:
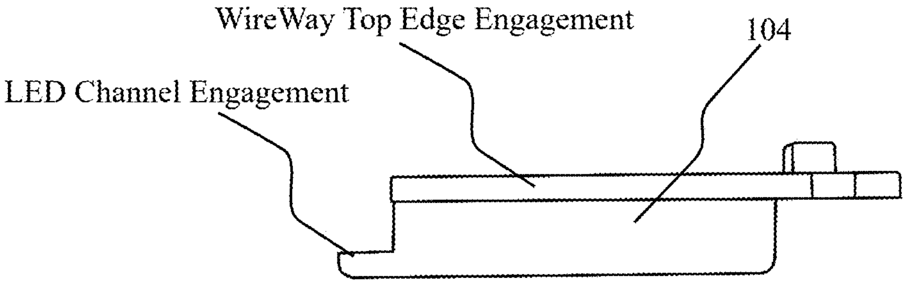

FIG. 23 and FIG. 24 are illustrations of a wireway cover 104, according to some aspects. The wireway cover 104 can be installed in the wireway 123 to protect wires that would otherwise be exposed. For example, wires carrying electric power from the LED driver to an LED assembly pass through the wireway 123. As discussed above, the LED driver can be a class 1 device. As such, the wires may carry a high voltage. The wireway covers may thereby improve safety and help the fixture meet the requirements of a class 1 UL certification.

Figure 25:
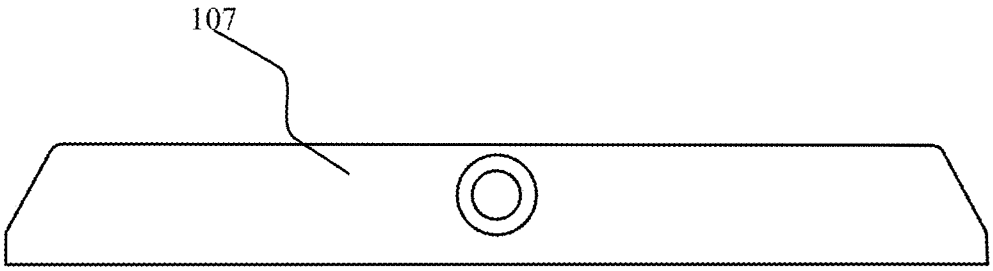
FIG. 25 and FIG. 26 are illustrations of a channel cap, according to some aspects.
Figure 26:
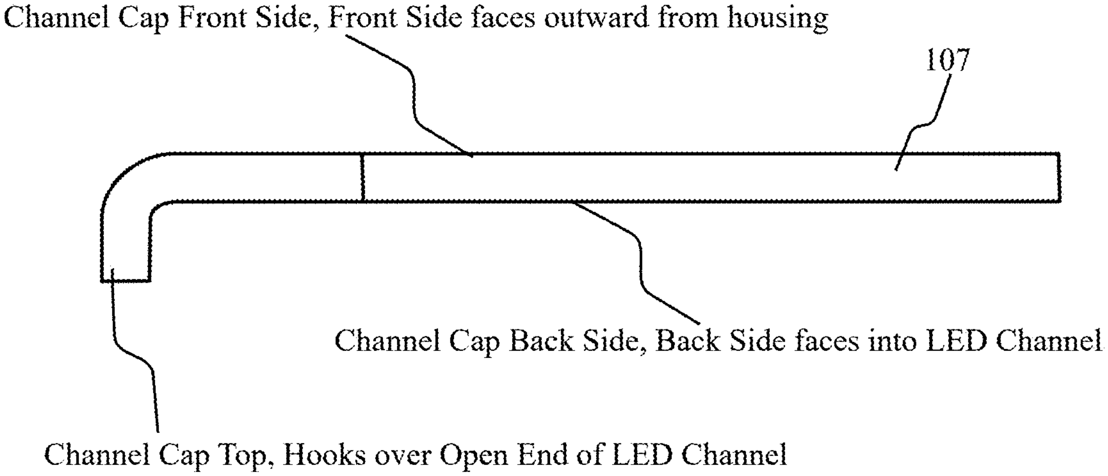

FIG. 25 and FIG. 26 are illustrations of a channel cap 107, according to some aspects. The channel cap 107 has a front side that faces outward from the housing 101 when the channel cap is attached to the housing 101 as shown in FIG. 3. The front side of the channel cap 107 can be seen in FIG. 13. The channel cap 107 has a back side that faces into the LED channel when the channel cap is attached to the housing 101 as shown in FIG. 3.

Figure 27:
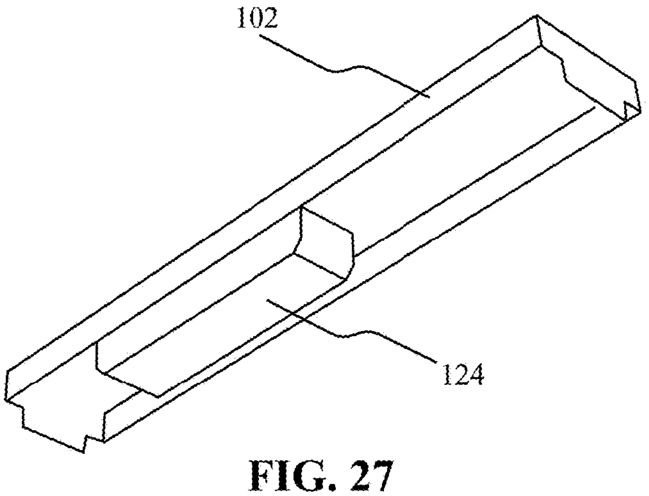
FIG. 27 is an illustration of a cover with an LED driver, according to some aspects.

FIG. 27 is an illustration of a cover 102 with an LED driver 124, according to some aspects. The LED driver 124 is attached to the cover 102 such that the cover 102 is a heat sink for the LED driver 124. In this arrangement the housing 101 is the heat sink for the LED arrays in the LED assemblies while the cover 102 is the heat sink for the LED driver 124.

Figure 28:
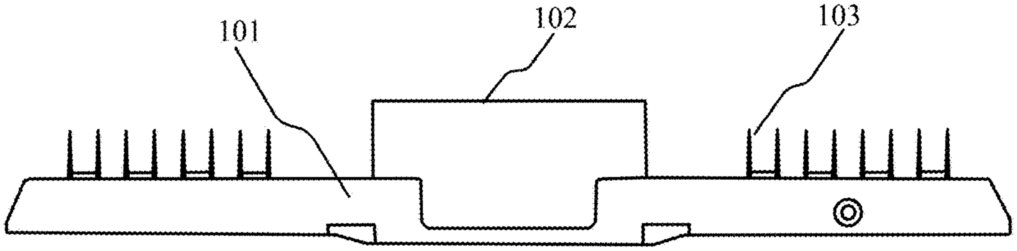
FIG. 28 is an illustration of the back of a light fixture, according to some aspects.
Figure 29:
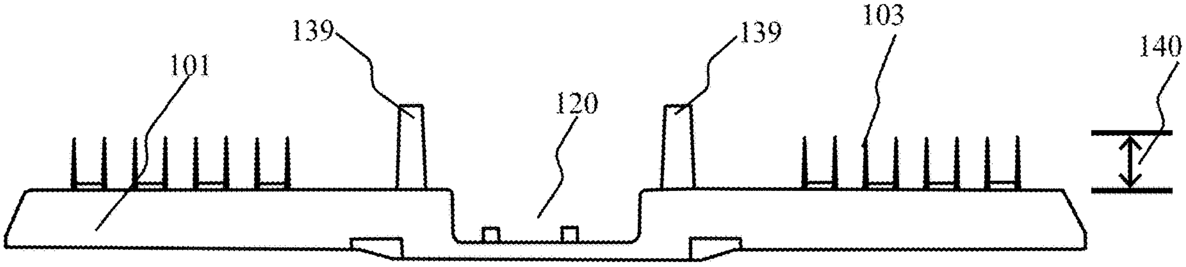
FIG. 29 is an illustration of the front of the housing of the light fixture illustrated in FIG. 28, according to some aspects.
Figure 30:
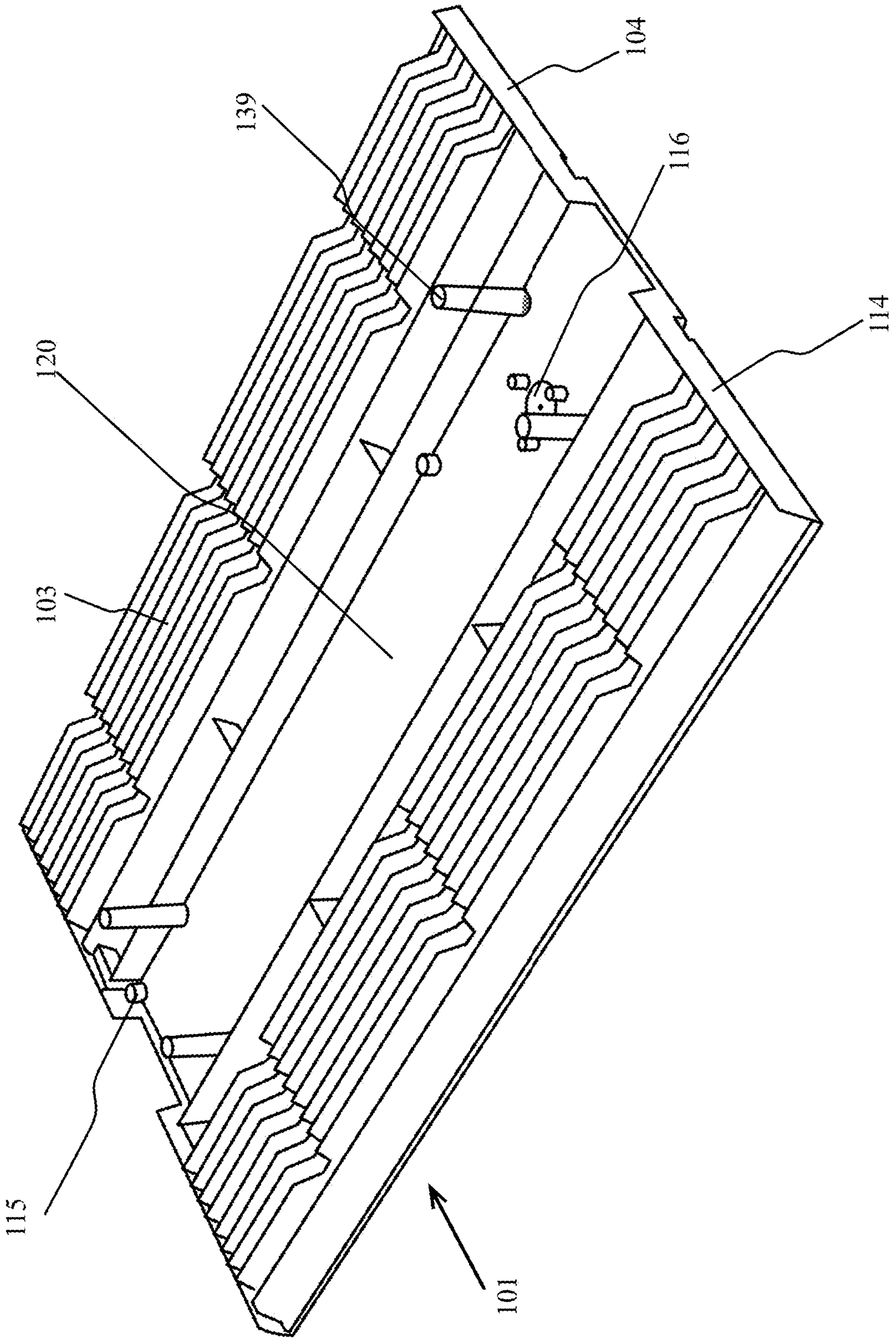
FIG. 30 is an illustration showing a top perspective view of the housing illustrated in FIG. 29, according to some aspects.

FIG. 28 is an illustration of the back of a light fixture, according to some aspects. FIG. 29 is an illustration of the front of the housing of the light fixture illustrated in FIG. 28, according to some aspects. Here, the light fixture is the LHB fixture that is larger than the high bay fixture shown in FIG. 1. The LHB fixture has taller cooling fins 103 than the high bay fixture shown in FIG. 1. The cooling fins 103 may be parallel to the long axis 132 of the housing which is also parallel to the long axis of the LED chambers. The cooling fins have a cooling fin height. The high bay housing has a 2.5 mm cooling fin height 140. The LHB housing has an 18 mm cooling fin height 140. Testing revealed that a cooling fin height greater than 15 mm is required in order for the LHB fixture to properly cool the LED arrays. The high bay fixture shown in FIG. 1 uses cover tabs 113 for attaching the cover to the housing. The LHB fixture shown uses cover standoffs 139 for attaching the cover to the housing. Cover screws can pass through the top of the cover and into the tops of the cover standoffs 139 to thereby attach the cover to the housing. FIG. 30 is an illustration showing a top perspective view of the housing illustrated in FIG. 29, according to some aspects.

FIG. 31 is an illustration showing the bottom of a light fixture 100 with a sensor 127, according to some aspects. The sensor 127 can pass through the hole the housing that is produced by knocking out the sensor knockout 135. The sensor 127 can be socketed into the sensor socket 125.

FIG. 32 is an illustration of an exploded view of a light fixture, according to some aspects. The left LED assembly 134 goes into the left LED channel 118 and the left lens 110 is installed in the housing such that light from the left LED array 144 can pass through the left lens 110 and illuminate the area below the light fixture. The right LED assembly 142 goes into the right LED channel 119 and the right lens 111 is installed in the housing such that light from the right LED array 145 can pass through the right lens 111 and illuminate the area below the light fixture.

FIG. 33 is an illustration of an internal circuit of a light fixture, according to some aspects. The LED driver 124 receives main power and produces power for the LEDs in the LED arrays on LED power outputs LED+ and LED−. The LED driver can also produce DC power (e.g., 12 VDC)

for powering a sensor 141 in the sensor socket 125. A dimming signal on lines DIM+ and DIM− may be provided by the sensor to the LED driver. The dimming signal can control the amount of power provided to the LED arrays 144, 145 via LED power output. The power provided to the LEDs on the LED power outputs is converted into light by the LEDs. More power results in more light. The DIM− line may be a DC ground or DC return for the 12 VDC line and DIM+ may be an amplitude signal relative to DC ground.

FIG. 34 is an illustration of an exploded view of a dual light fixture, according to some aspects. There are doubled versions of both the high bay light fixture (200/260/300 W) and the LHB fixture (420/520/600 W). A first housing 101 and a second housing 149 can be attached end-to-end by a bonding bracket 148. A dual housing cover 146 covers the component trays 120 of both fixtures. The dual fixture uses dual housing lenses 147 that are twice the length of single housing lenses such as the left lens 110 and the right lens 111 discussed above. The dual lens is used so that a gap or break in the lens is not visible from below.

FIG. 35 is an illustration of a bonding bracket 148, according to some aspects. The bonding bracket 148 is attached to the bonding bracket mount points 115 of the housing 101 and the second housing 149 to thereby join the housings and create a dual light fixture.

FIG. 36 is an illustration of an internal circuit of a dual light fixture, according to some aspects. The internal circuit for the dual light fixture is similar to the internal circuit shown in FIG. 33 with the exception that the 1st LED array and the 2nd LED array are wired in series with one another. The 3rd LED array and the 4th LED array are also wired in series with one another. Other implementations may have all four LED arrays wired in series. The LED driver may run at a higher voltage when the LED arrays are wired in series, thereby increasing lighting efficacy. Only one of the fixtures has a sensor socket because a single internal sensor controller can control the lighting levels of the entire dual light fixture.

FIG. 37 is an illustration of an exploded view of a triple light fixture, according to some aspects. There are tripled versions of both the high bay light fixture (300/390/450 W) and the LHB fixture (630/780/900 W). Only one fixture has a sensor socket because a single internal sensor controller can control the lighting levels of the entire fixture. A first housing 101, a second housing 149, and a third housing 150 can be attached end-to-end by bonding brackets 148. A triple housing cover 151 covers the component trays 120 of all three fixtures. The triple fixture uses triple housing lenses 152 that are three times the length of single housing lenses such as the left lens 110 and the right lens 111 discussed above. The triple lens is used so that a gap or break in the lens is not visible from below.

FIG. 38 is an illustration of an internal circuit of a triple light fixture, according to some aspects. The internal circuit for the triple light fixture is similar to the internal circuits shown in FIGS. 33 and 38 with the exception that a second LED driver 153 is used to power some of the LED arrays. The 1st LED array, the 2nd LED array, and the 3rd LED array are wired in parallel and powered by the LED driver 124. The 4th LED array, the 5th LED array, and the 6th LED array are wired in parallel and powered by the second LED driver 153. Only one of the fixtures has a sensor socket because a single internal sensor controller can control the lighting levels of the entire triple light fixture.

FIG. 39 is an illustration of an LED assembly 134, according to some aspects. The LED assembly can be a circuit board with an LED array 154. The LED array is many individual LEDs that are attached to the circuit board. The circuit board is shown as a single sided circuit board where all of the circuit board traces and pads are on one side of the circuit board.

FIG. 40 is an illustration of a wire guard 155 for a lighting fixture, according to some aspects. The wire guards 155 are designed to slide into position along the short axis of the LED channels. The top sides of the housings at the ends of the LED channels have raised ends. Each end of the wire guard has a hook shaped tab 162 and a fastener tab 156. As can be seen in the figures, the hook shaped tab hooks over the raised end of the LED channel. A screw passes through a hole in the fastener end and binds against the raised end of the LED channel. The hole in the fastener tab can be a threaded hole such that the screw threads through the threaded hole. The hook shaped tabs on both ends of the wire guard are hooked over the raised ends on both ends of the LED channel when the wire guard is installed. The screws pass through the fastener tabs on both ends of the wire guard and bind against the raised ends on both ends of the LED channel when the wire guard is installed. Alternative wire guards may have four fastener tabs (two on each end) and may have no hook shaped tabs. Other alternatives may have four hook shaped tabs (two on each end) and a binding device or fastening device that prevents the wire guard from sliding off the LED channel. For example, a fastener passing through an end of the wire guard can bind or fasten the wire guard in place. Similarly, a binding tab may interface with an inside edge of the LED channel (the edge between the LED channel and the component tray) to thereby bind or fasten the wire guard in place.

For a double housing fixture, a single wire guard may be installed to protect two LED channels that are positioned end to end as if the two LED channels are a single double length LED channel. For a triple housing fixture, a single wire guard may be installed to protect three LED channels that are positioned end to end as if the three LED channels are a single triple length LED channel.

FIG. 41 is an illustration of an emergency backup 161 for a lighting fixture 100, according to some aspects. The emergency backup 161 may be attached to the cover 102. FIG. 42 is an illustration of an internal circuit of a light fixture with an emergency backup, according to some aspects. The emergency backup can contain a battery 157 and an emergency LED driver 158. The emergency LED driver provides power to the LED driver on the driver power lines Driver-1 and Driver-N. Here, the driver power lines are connected to the LED driver 124 instead of the mains power lines as in FIG. 33, FIG. 36, and FIG. 38.

When main power is available, the emergency LED driver 158 supplies power from the mains power lines to the LED driver 124. The emergency LED driver 158 may also charge the battery 157 while mains power is available. When mains power is lost, the emergency LED driver 158 can be powered by the battery 157 and can supply power from the battery 157 to the LED driver 124. A test switch and indicator 160 may be installed in the hole left in the housing by knocking out the test and indicator knockout 163. The emergency LED driver 158 causes the indicator in the switch and indicator 160 to illuminate when the switch in the switch and indicator 160 is actuated and the emergency LED driver 158 determines that the battery is charged and that the emergency LED driver 158 is able to power the LED driver if mains power is lost. A dimmer 159 may adjust the lighting level when the emergency LED driver 158 is running off the battery 157.

There can be variations for each model of high bay fixture and LHB fixture. For example, the single housing high bay fixture can have a 100 W LED driver, a 130 W LED driver, or a 150 W LED driver. Some models of the single housing high bay fixture have a sensor socket. Some models of the single housing high bay fixture have lenses that produce a "90×90" lighting pattern. Some models of the single housing high bay fixture have lenses that produce a "45×110" lighting pattern. Those familiar with high bay LED lighting fixtures are familiar with "90×90" lighting patterns and "45×110" lighting patterns.

What is claimed is:

1. A light fixture comprising:

a housing that includes a left section, a right section, and a center section;

a plurality of left airways located between the left section and the center section;

a cover that is attached to the center section and that covers a component tray of the center section;

a right LED assembly in a right LED channel of the right section;

a right lens that slides into the right section and that is held in the right section by a closed end of the right section and a right channel cap attached at an open end of the right section;

a left LED assembly in a left LED channel of the left section;

a left lens that slides into the left section and that is held in the left section by a closed end of the left section and a left channel cap attached at an open end of the left section; and an LED driver, wherein:

the housing is monolithic and die cast aluminum;

the left section and the right section include a plurality of cooling fins;

electric power is provided to the left LED assembly by the LED driver;

the left lens transmits light from the left LED assembly to thereby illuminate an area under the light fixture; and the right lens transmits light from the right LED assembly to thereby illuminate the area under the light fixture.

2. The light fixture of claim 1 wherein the LED driver is attached to the cover.

3. The light fixture of claim 1 wherein:

the housing includes a wireway between the component tray and the left LED channel; and a wire passing through the wireway connects the LED driver to the left LED assembly.

4. The light fixture of claim 3 wherein the component tray is on a top of the housing and the left LED channel is on a bottom of the left section.

5. The light fixture of claim 1 further including:

a plurality of lens tabs formed in the housing, wherein:

the lens tabs are located below the left lens; and the lens tabs prevent the left lens from falling out of the housing.

6. The light fixture of claim 1 further including:

a plurality of right airways located between the right section and the center section.

7. The light fixture of claim 6, wherein the left airways allow air to flow from below the light fixture to above the light fixture via the left airways.

8. The light fixture of claim 1, wherein the housing is symmetric across a long axis of the housing.

9. The light fixture of claim 1, wherein the left LED assembly includes a plurality of LEDs that are powered by the LED driver and that produce light that the left lens transmits to thereby illuminate the area under the light fixture.

10. The light fixture of claim 1, further including a sensor mount point that is included in the center section, wherein the sensor mount point has a sensor knockout that is configured to be removed from the sensor mount point such that a sensor attached to the sensor mount point passes through the housing.

11. The light fixture of claim 1, wherein:

the center section includes a sensor mount point;

a sensor socket is attached to the housing at the sensor mount point; and the sensor mount point and the sensor socket are configured for a sensor to be removably plugged into the sensor socket from below the housing.

12. The light fixture of claim 1, wherein:

the LED driver provides the electric power to the right LED assembly; and the right LED assembly includes another plurality of LEDs that are powered by the LED driver and that produce light that the right lens transmits to thereby illuminate the area under the light fixture.

13. The light fixture of claim 1, wherein the housing includes a plurality of cover tabs, and the cover is attached to the housing by the cover tabs.

14. The light fixture of claim 1, wherein the housing includes a plurality of cover standoffs, and the cover is attached to the housing by the cover standoffs.

15. A light fixture comprising:

a housing that includes a left section, a right section, and a center section;

a cover that is attached to the housing and that covers a component tray of the center section;

a right LED assembly in a right LED channel of the right section;

a right lens that slides into the right section and that is held in the right section by a closed end of the right section and a right channel cap attached at an open end of the right section;

a left LED assembly in a left LED channel of the left section;

a left lens that slides into the left section and that is held in the left section by a closed end of the left section and a left channel cap attached at an open end of the left section; and an LED driver located between the cover and the center section, wherein:

the housing is monolithic and die cast aluminum;

wherein housing is a rectangular housing;

the left section and the right section include a plurality of cooling fins;

the LED driver provides electric power to the left LED assembly;

the left lens transmits light from the left LED assembly to thereby illuminate an area under the light fixture;

the right lens transmits light from the right LED assembly to thereby illuminate the area under the light fixture; and the center section is configured for attaching a front side of the housing to a back side of a second housing.

16. The light fixture of claim 15, wherein:

the center section includes a plurality of bonding bracket mount points configured to attach a bonding bracket to the housing; and attaching the second housing to the bonding bracket while the bonding bracket is attached to the housing attaches the front side of the housing to the back side of the second housing.

17. The light fixture of claim 16, further including the bonding bracket and the second housing, wherein the bonding bracket is attached to the bonding bracket mount points of the housing and to the bonding bracket mount points of the second housing.

18. The light fixture of claim 16, further including:

a second light fixture that includes the second housing, wherein the cover covers the component tray of the housing and the component tray of the second housing.

19. The light fixture of claim 18 further including:

a plurality of lens tabs formed in the housing;

a plurality of left airways located between the left section and the center section; and a plurality of right airways located between the right section and the center section;

wherein:

the LED driver is attached to the cover;

a wire that passes through a wireway formed in the housing connects the LED driver to the left LED assembly;

the component tray is on a top of the housing and the left LED channel is on a bottom of the left section;

the lens tabs are located below the left lens;

the lens tabs prevent the left lens from falling out of the housing;

the left airways allow air to flow from below the light fixture to above the light fixture via the left airways;

the housing is symmetric across a long axis of the housing;

the left LED assembly includes a plurality of LEDs that are powered by the LED driver and that produce light that the left lens transmits to thereby illuminate the area under the light fixture;

the center section includes a sensor mount point;

the sensor mount point has a sensor knockout that is configured to be removed from the sensor mount point such that a sensor attached to the sensor mount point passes through the housing;

a sensor socket is attached to the housing at the sensor mount point;

the sensor mount point and the sensor socket are configured for the sensor to be removably plugged into the sensor socket from below the housing;

the LED driver provides the electric power to the right LED assembly;

the right LED assembly includes another plurality of LEDs that are powered by the LED driver and that produce light that the right lens transmits to thereby illuminate the area under the light fixture;

the housing includes a plurality of cover tabs, and the cover is attached to the housing by the cover tabs; and the housing includes a plurality of cover standoffs, and the cover is attached to the housing by the cover standoffs.

20. A light fixture comprising:

a housing means for housing the light fixture;

a left housing means for holding a left LED assembly and a left lens;

a right housing means for holding a right LED assembly and a right lens;

a power means for electrically powering the left LED assembly and the right LED assembly;

a cover means for covering the power means, the power means located between the cover means and a center section of the housing means;

a plurality of left airways located between the left housing means and the center section; and a cooling means for cooling the left LED assembly and the right LED assembly, wherein:

the cover means is attached to the center section and that covers a component tray of the center section;

the housing means is monolithic and is die cast aluminum; and the housing means includes the left housing means, the right housing means, the center section, and the cooling means.

* * * * *